(12) United States Patent
Osborn et al.

(10) Patent No.: US 12,141,793 B2
(45) Date of Patent: Nov. 12, 2024

(54) SYSTEMS AND METHODS FOR GENERATING VARIABLE NON-FUNGIBLE TOKENS LINKED TO DESIGNATED OFF-CHAIN COMPUTER RESOURCES FOR USE IN SECURE ENCRYPTED, COMMUNICATIONS ACROSS DISPARATE COMPUTER NETWORK

(71) Applicant: Capital One Services, LLC, McLean, VA (US)

(72) Inventors: Kevin Osborn, Newton Highlands, MA (US); Austin Erickson, Herndon, VA (US); Christopher Wu, Ashburn, VA (US); Timur Sherif, Silver Spring, MD (US)

(73) Assignee: Capital One Services, LLC, McLean, VA (US)

( * ) Notice: Subject to any disclaimer, the term of this patent is extended or adjusted under 35 U.S.C. 154(b) by 133 days.

(21) Appl. No.: 17/853,499

(22) Filed: Jun. 29, 2022

(65) Prior Publication Data
US 2024/0005309 A1 Jan. 4, 2024

(51) Int. Cl.
G06Q 20/00 (2012.01)
G06Q 20/36 (2012.01)
H04L 9/00 (2022.01)
H04L 9/08 (2006.01)
H04L 9/32 (2006.01)

(52) U.S. Cl.
CPC ..... *G06Q 20/3678* (2013.01); *G06Q 20/3674* (2013.01); *H04L 9/0825* (2013.01); *H04L 9/3213* (2013.01); *H04L 9/50* (2022.05); *G06Q 2220/00* (2013.01); *H04L 2209/60* (2013.01)

(58) Field of Classification Search
None
See application file for complete search history.

(56) References Cited

U.S. PATENT DOCUMENTS

| 11,348,099 | B2* | 5/2022 | Vijayan | H04L 9/3247 |
|---|---|---|---|---|
| 11,562,451 | B1* | 1/2023 | Kozlowski, III | G06F 16/27 |
| 11,769,143 | B1* | 9/2023 | Godlove | G06Q 20/389 |
| | | | | 705/65 |
| 2020/0005284 | A1* | 1/2020 | Vijayan | H04L 9/3247 |
| 2021/0248214 | A1* | 8/2021 | Goldston | G06F 21/16 |
| 2021/0281410 | A1* | 9/2021 | Hain | G06Q 20/065 |
| 2022/0173893 | A1* | 6/2022 | Basu | H04L 9/3247 |
| 2022/0229883 | A1* | 7/2022 | Khandelwal | G06F 21/64 |
| 2022/0270084 | A1* | 8/2022 | Xue | H04L 9/088 |
| 2022/0271915 | A1* | 8/2022 | Turner | H04L 9/3247 |

(Continued)

OTHER PUBLICATIONS

Belotti; Vademecum on Blockchain Technologies; IEEE; pp. 3796-3838; 2019.*
Liu; Blockchain_and_Machine_Learning; IEEE; pp. 1392-1431; 2020.*

*Primary Examiner* — Radu Andrei
(74) *Attorney, Agent, or Firm* — Foley & Lardner LLP

(57) ABSTRACT

Systems and methods related to a variable non-fungible token. A variable non-fungible token comprises a non-fungible token that is minted with an indication of a non-transferable ownership wallet (e.g., a digital wallet for which the non-fungible token is minted for), a non-transferable smart contract address that has permissions for updating metadata for the variable non-fungible token, and a metadata property threshold based on a specific user corresponding to the digital wallet.

19 Claims, 7 Drawing Sheets

(56) References Cited

U.S. PATENT DOCUMENTS

| | | | |
|---|---|---|---|
| 2022/0309491 A1* | 9/2022 | Shapiro | G06F 21/64 |
| 2022/0358186 A1* | 11/2022 | Deuel | G06Q 40/04 |
| 2023/0006976 A1* | 1/2023 | Jakobsson | H04L 9/50 |
| 2023/0041807 A1* | 2/2023 | Benedetto | G06F 3/0484 |
| 2023/0070586 A1* | 3/2023 | Kapur | G06Q 20/123 |
| 2023/0073859 A1* | 3/2023 | Matthews | G06Q 30/0641 |
| 2023/0080599 A1* | 3/2023 | Rose | G06Q 20/36 705/75 |
| 2023/0088936 A1* | 3/2023 | Chalkley | H04L 9/3213 705/26.81 |
| 2023/0092012 A1* | 3/2023 | Matthews | G06Q 20/0658 |
| 2023/0098615 A1* | 3/2023 | Advani | H04L 9/3239 713/193 |
| 2023/0102606 A1* | 3/2023 | Advani | G06F 16/27 726/4 |
| 2023/0109574 A1* | 4/2023 | Vosseller | G06F 21/64 705/317 |
| 2023/0169498 A1* | 6/2023 | Sado | G06F 3/167 705/41 |
| 2023/0198760 A1* | 6/2023 | Ferenczi | H04L 9/3247 713/168 |
| 2023/0230186 A1* | 7/2023 | Spangenberg | G06Q 30/0206 705/7.35 |
| 2023/0237471 A1* | 7/2023 | Siedleczka | G06Q 20/389 705/75 |
| 2023/0252733 A1* | 8/2023 | Herrity | H04L 9/50 345/633 |
| 2023/0289802 A1* | 9/2023 | Thaw | H04L 9/50 |
| 2023/0356091 A1* | 11/2023 | Eisenberg | A63F 13/79 |
| 2023/0359710 A1* | 11/2023 | Welch | G06F 3/0484 |
| 2023/0360029 A1* | 11/2023 | Pranger | G06Q 20/10 |
| 2023/0376572 A1* | 11/2023 | Barba | G06F 21/10 |
| 2023/0385896 A1* | 11/2023 | Gonta | G06Q 20/40145 |
| 2023/0419282 A1* | 12/2023 | Pigg | G06Q 30/06 |
| 2024/0012834 A1* | 1/2024 | Terborg | G06F 11/3419 |

\* cited by examiner

SYSTEMS AND METHODS FOR GENERATING VARIABLE NON-FUNGIBLE TOKENS LINKED TO DESIGNATED OFF-CHAIN COMPUTER RESOURCES FOR USE IN SECURE ENCRYPTED, COMMUNICATIONS ACROSS DISPARATE COMPUTER NETWORK

BACKGROUND

In recent years, the use of blockchain technology for various applications, including, but not limited to, smart contracts, non-fungible tokens, cryptocurrency, smart finance, blockchain-based data storage, etc. (referred to collectively herein as blockchain applications) has exponentially increased. Each of these applications benefits from blockchain technology that allows for the recording of information that is difficult or impossible to change (either in an authorized or unauthorized manner). For example, a blockchain is essentially a digital ledger of transactions that is duplicated and distributed across the entire network of computer systems on the blockchain. That is, the digital ledger of a blockchain is a decentralized source of information that does not require a central authority to monitor transactions, maintain records, and/or enforce rules. Instead, technology underlying the blockchain network, namely cryptography techniques (e.g., secret-key, public key, and/or hash functions), consensus mechanisms (e.g., Proof of Work ("POW"), Proof of Stake ("POS"), Delegated Proof of Stake ("dPOS"), Practical Byzantine Fault Tolerance ("pBFT"), Proof of Elapsed Time Broadly ("PoET"), etc.), and computer networks (e.g., peer-to-peer ("P2P"), the Internet, etc.) combine to provide a decentralized environment that enables the technical benefits of blockchain technology.

However, despite these benefits and despite the wide-ranging number of potential applications, practical implementations of blockchain technology have been hindered by several technical problems. First, blockchain technology often relies on large amounts of energy and dedicated resources to ensure that consensus mechanisms (e.g., POW) run. Second, despite the mainstream popularity of blockchain technology, practical implementations of blockchain technology require specialized knowledge to design, program, and integrate blockchain technology-based solutions, which limits the amount of people and resources available to create these practical implementations. Third, blockchain technology, despite its decentralized nature, faces scalability issues and/or low transaction speeds when attempting to accommodate a large number of users at a given time. Finally, depending on the application and the intent of the users, the key benefits of blockchain technology such as a public ledger, use of digital wallets, and immutable transactions, may be seen negatively by users that wish to maintain privacy of transactions, wish to know the true identities of users involved in transactions, and wish to reverse unauthorized transactions, respectively.

SUMMARY

Systems and methods are described herein for novel uses and/or improvements to blockchain technology. In particular, the systems and methods relate to the creation, use, and integration with legacy systems of a novel token standard (e.g., a variable non-fungible token). The variable non-fungible token shares characteristics with conventional non-fungible tokens, but also divergences from the prior token standards in that it may more easily and efficiently interact with legacy (e.g., non-blockchain) systems. The technical aspects of the novel token standard are discussed below.

In a first aspect, systems and methods are described for generating a variable fungible token. For example, a fundamental limitation of smart contracts is that they cannot inherently interact with data and systems existing outside their native blockchain environment (e.g., off-chain data). To overcome this, the smart contracts are designed to receive off-chain data from oracles (e.g., entities that connect blockchains to external systems). This presents a security weak point if the oracle (or its data) is corrupted because the data being delivered by the corrupted oracle to the blockchain may be highly incorrect and lead to smart contracts executing very wrong outcomes. Additionally, because blockchain transactions are automated and immutable, a smart contract outcome based on faulty data cannot be reversed. As such, conventional blockchain oracles rely on a Decentralized Oracle Network ("DON") that combines multiple independent oracle node operators and multiple reliable data sources to establish end-to-end decentralization. This, however, also creates an issue in blockchain functions that rely on high volumes of off-chain data. For example, if off-chain data is routinely updated and required for performing blockchain functions, any update or data pull must be validated via a consensus mechanism for the network, which limits transaction speed. In blockchain functions that rely on high volumes of off-chain data, the limited transaction speeds may compound leading to network bottlenecks.

In contrast to this conventional approach, the methods and systems herein relate to a novel token standard for use in blockchain functions requiring a high volume of off-chain data. In particular, the methods and systems relate to a variable non-fungible token, which may prevent the network bottlenecks described above as the variable non-fungible token is defined by a series of attributes that allow it to access high-volumes of off-chain data, minimize security issues, and maintain high transaction speeds.

To achieve these benefits, the variable non-fungible token comprises a non-fungible token that is minted with an indication a non-transferable ownership wallet (e.g., a digital wallet for which the non-fungible token is minted for), a non-transferable smart contract address that has permissions for updating metadata for the variable non-fungible token, and metadata property threshold based on a specific user corresponding to the digital wallet. Finally, the metadata itself is stored at a centralized location (e.g., as identified by a second smart contract) at which it may be updated by the non-transferable smart contract address. That is, the metadata is stored off-chain and at a secure location, which allows for high transaction and update speeds for high volumes of data, received from the centralized location while the non-transferable attributes of the non-fungible token ensure that only a user for which the non-fungible token was minted may access the centralized location.

This unique combination of attributes allows for the aforementioned technical benefits while mitigating the technical problems. For example, by minting the non-fungible token with encoded instructions restricting the source of a current state of metadata for the token as well as metadata property thresholds that must be met for using the token, the maintenance of this metadata and validations against this metadata may be performed off-chain and in a resource-efficient manner. Furthermore, by restricting the transferability of the token and determining the metadata property thresholds based on the user requesting the token, the use of the token may remain on-chain and in control of the user.

In this aspect, systems and methods are described for minting non-fungible tokens with variable metadata properties. For example, the system may receive, from a user-specific digital storage resource application on a user device, a user request to generate a non-fungible token with variable metadata properties. The system may, in response to the user request, retrieve a user profile corresponding to the user-specific digital storage resource application. The system may determine, based on the user profile, a first metadata property threshold for a first metadata property of the non-fungible token. The system may determine a first encoded instruction for a first smart contract for the non-fungible token, wherein the first encoded instruction comprises a first automatic response to a first type of blockchain function of a plurality of types of blockchain functions interacting with the first smart contract, wherein the first automatic response comprises a comparison of a current state of the first metadata property against the first metadata property threshold, wherein the current state is stored off-chain. The system may determine a second encoded instruction for the first smart contract, wherein the second encoded instruction comprises a second automatic response to the first type of blockchain function interacting with the first smart contract, wherein the second automatic response comprises querying a non-transferable smart contract address for the current state. The system may cause to be generated, at the user-specific digital storage resource application on the user device, a private key for the non-fungible token.

In a second aspect, systems and methods are described for dynamically updating metadata during blockchain functions. For example, non-fungible tokens have gained popularity as a mechanism to assign authenticity and/or ownership to a digital asset. A blockchain network may then act as a standardized medium for listing and trading non-fungible tokens that are transparent, globally accessible, and more liquid. By listing and trading the non-fungible tokens, the value underlying the non-fungible tokens changes. However, a fundamental concept of non-fungible tokens is that while the value and/or ownership of a non-fungible token may change, the underlying metadata (e.g., an image, artwork, or other item to which the non-fungible token represents) does not. A token minter (e.g., the entity that created the non-fungible token) controls that smart contract for the non-fungible token. This fundamental concept provides the innate security and authenticity for the non-fungible token. For example, it ensures that artwork (e.g., represented by an off-chain image) is not changed. However, this fundamental concept also creates a technical problem in that underlying metadata cannot be updated by users during the life of the non-fungible token (e.g., a change in networking protocol may cause metadata in a non-fungible token to direct a user to a data source or website that no longer exists).

One solution to overcoming this problem is to dynamically mint new non-fungible tokens with the new tokens having the preferred properties (e.g., an updated networking protocol, etc.). However, newly minting non-fungible tokens each time new properties and/or metadata is needed limits the ability of the token to be a reusable asset for facilitating blockchain functions over the long term. In contrast to this solution, the systems and methods describe the use of a novel mechanism for a novel non-fungible token that does not have static properties and/or metadata. Instead, the non-fungible token allows for a specific smart contract (e.g., identified by a specific contract address) to verify off-chain metadata (e.g., based on an on-chain characteristic) and update off-chain metadata (e.g., following performance of a blockchain function) of the non-fungible token. By doing so, the system enables the non-fungible token to be reusable for multiple blockchain functions despite each function requiring an update to the metadata.

In this aspect, systems and methods are described for dynamically updating metadata during blockchain functions. For example, the system may receive a first request to perform a blockchain function using a non-fungible token, wherein the non-fungible token is identified by a public key for a first digital wallet application on a user device. The system may, in response to the first request, retrieve an off-chain metadata property of the non-fungible token, wherein the off-chain metadata property is available from an off-chain resource. The system may authorize the blockchain function using a smart contract that compares an on-chain characteristic of the blockchain function to the off-chain metadata property. The system may, in response to authorizing the blockchain function, transmit a user approval request of the blockchain function to the first digital wallet. The system may receive, from the first digital wallet application on the user device, a confirmation of the blockchain function in response to the user approval request, wherein the confirmation is based on a private key for the first digital wallet. The system may, in response to receiving the confirmation, cause performance of the blockchain function and updating the off-chain metadata property.

In a third aspect, systems and methods are described for integrating blockchain functions and external systems using wallet-specific digital assets. For example, the use of blockchain technology and applications that use blockchain technology has increased exponentially. However, a fundamental issue with blockchain technology is its reliance on cryptocurrency and/or stablecoins (e.g., cryptocurrencies linked to a non-blockchain based asset) to facilitate blockchain functions (e.g., transactions), which are incomputable with external systems. This limitation dampens the ability of blockchain applications to be integrated into non-blockchain systems. The conventional approach to this integration is to convert blockchain functions (and the underlying cryptocurrency transactions) into non-blockchain functions. The result of the conversion is then processed along legacy (e.g., non-blockchain) systems. However, by doing this, the benefits of the use of blockchain technology (e.g., the lack of a required central authority, the public record of transactions, etc.) are removed. Furthermore, any blockchain application must itself be designed to be compatible with the legacy systems, requiring an additional programming burden.

In view of this problem, the systems and methods described herein use a novel wallet-specific digital asset. For example, in contrast to conventional systems, which require conversion of a blockchain function to that of a legacy system (e.g., an off-chain system), the methods and systems use a wallet-specific digital asset to interface with legacy systems. Specifically, the wallet-specific digital asset may include dynamically updatable off-chain metadata based on interactions with legacy systems. As the metadata is stored off-chain, the legacy systems may interact with this information. However, as the non-fungible token, and in particular the ownership information of the non-fungible token, remains on-chain, blockchain applications may still interface with the non-fungible token.

In this aspect, systems and methods are described for integrating blockchain functions and external systems using wallet-specific digital assets. For example, the system may receive, from a digital wallet application on a user device, a first user input to perform an off-chain function with a first content provider. The system may, in response to the first user input, determine an off-chain characteristic corresponding to the off-chain function. The system may receive a second user input selecting a first non-fungible token for satisfying the off-chain characteristic. The system may, in response to the second user input, generate a communication to an off-chain resource identified by the first non-fungible token for authorization to perform the off-chain function using the first non-fungible token, wherein performing the off-chain function causes an off-chain metadata property for the first non-fungible token to be modified. The system may, in response receiving the authorization to perform the off-chain function, receive a user approval request to perform an on-chain blockchain function corresponding to the off-chain function. The system may generate, from the first digital wallet application on the user device, a confirmation of the blockchain function in response to the user approval request, wherein the confirmation is based on a private key for the first digital wallet, and wherein the generating to confirmation causes performance of the on-chain blockchain function and a modification of the off-chain metadata property.

Various other aspects, features, and advantages of the invention will be apparent through the detailed description of the invention and the drawings attached hereto. It is also to be understood that both the foregoing general description and the following detailed description are examples and are not restrictive of the scope of the invention. As used in the specification and in the claims, the singular forms of "a," "an," and "the" include plural referents unless the context clearly dictates otherwise. In addition, as used in the specification and the claims, the term "or" means "and/or" unless the context clearly dictates otherwise. Additionally, as used in the specification, "a portion" refers to a part of, or the entirety of (i.e., the entire portion), a given item (e.g., data) unless the context clearly dictates otherwise.

DETAILED DESCRIPTION OF THE DRAWINGS

In the following description, for the purposes of explanation, numerous specific details are set forth in order to provide a thorough understanding of the embodiments of the invention. It will be appreciated, however, by those having skill in the art that the embodiments of the invention may be practiced without these specific details or with an equivalent arrangement. In other cases, well-known structures and devices are shown in block diagram form in order to avoid unnecessarily obscuring the embodiments of the invention.

Figure 1:
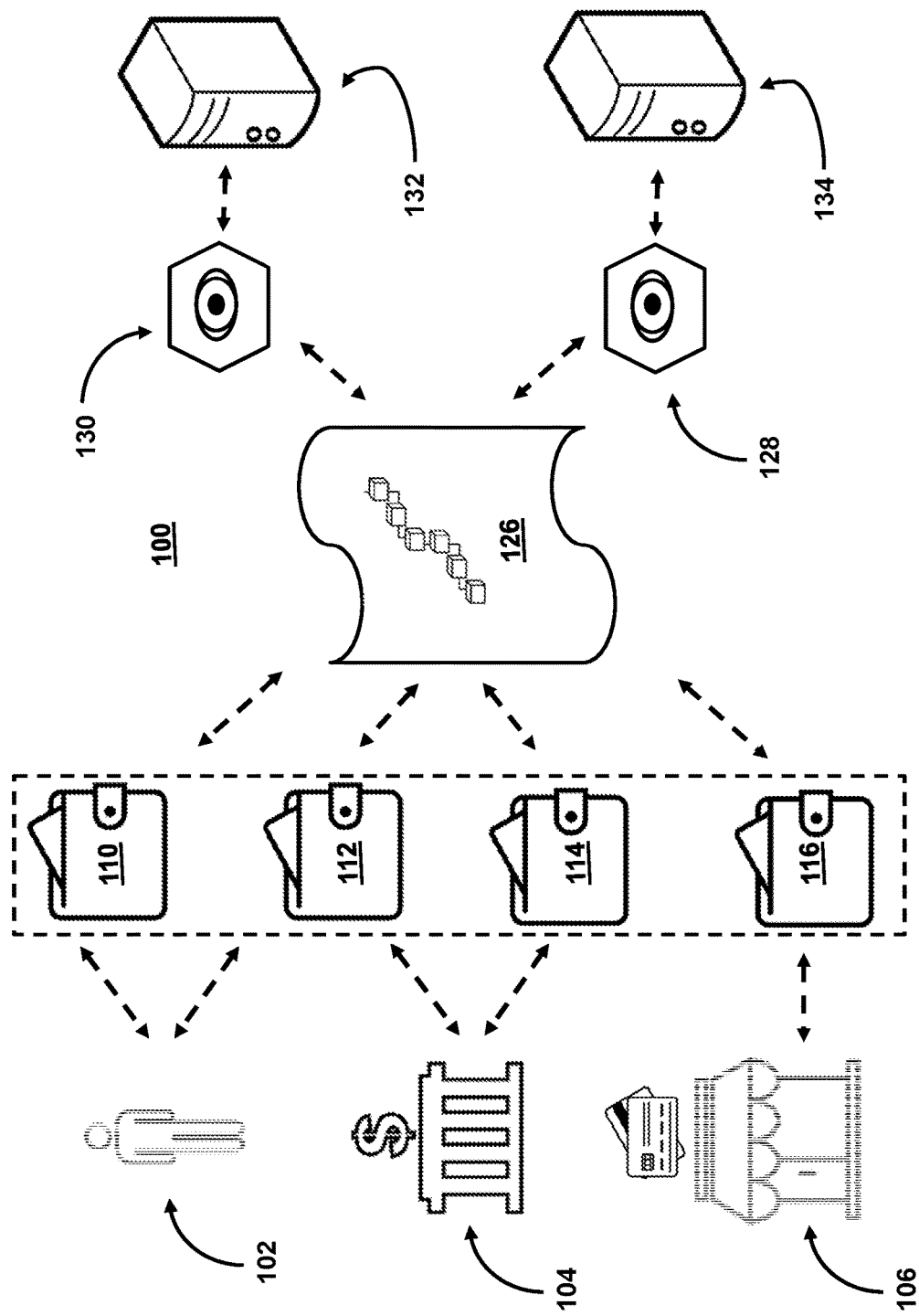
FIG. 1 shows an illustrative diagram for blockchain functions related to a variable non-fungible token, in accordance with one or more embodiments.

FIG. 1 shows an illustrative diagram for blockchain functions related to a variable non-fungible token, in accordance with one or more embodiments. For example, FIG. 1 includes ecosystem 100. Ecosystem 100 includes user 102. User 102 may comprise a human user or other entity. In some embodiments, user 102 may correspond to a user account. For example, user 102 may correspond to a user account for a user-specific digital storage resource application on a user device.

Ecosystem 100 also includes lender 104 which may comprise a credit card provider, a line of credit provider, a bank and/or a service provider. In some embodiments, lender 104 may comprise a payment service network. For example, an acquiring bank may receive payment authorization requests from a source (e.g., receiver 106) and send them to an issuing bank (which may include, or be a separate entity from, the acquiring bank). The acquiring bank may then relay a response from issuing bank to the source. In some embodiments, the acquiring bank may be a third-party entity. The acquiring bank may provide a service or device that allows a source to accept credit cards as well as send credit card payment details to a network. Upon receipt, the network may forward the payment authorization back to the acquiring bank.

The network may include entities that operate credit card networks that process credit card payments worldwide, extend lines of credit, and/or govern interchange fees. For example, an issuing bank may be a financial institution that issues a credit card and/or line of credit linked to a variable non-fungible token involved in a blockchain function (e.g., a transaction). An issuing bank may receive a payment authorization request from the credit card network and either approve or decline the transaction.

Ecosystem 100 also includes receiver 106, which may be associated with a store and/or vendor that sells goods and/or services to user 102 and/or facilitates a blockchain function (e.g., a transaction). Receiver 106, which may be a merchant, may accept credit card payments, debits against a line of credit, etc. Receiver 106 may also send credit, debit instructions, and/or user account information to, and request payment authorization from an issuing bank corresponding to the non-fungible token (or a line of credit related to the non-fungible token). Receiver 106 may be assigned information by a network upon registration. That information may include a merchant/source ID, a network name, and an address. The network may further generate a cleansed network name based on a native network name (e.g., a network name based on a proprietary and/or non-public algorithm for generating a network name based on available data of a merchant when the merchant registers with the network).

During a blockchain function in ecosystem 100, user 102 may use a variable non-fungible token. As described herein, the variable non-fungible token may serve as a mechanism for performing blockchain-based payments (e.g., a payment between user 102 and receiver 106). For example, when making blockchain-based payments today, users are limited to two types of funding sources: 1) their cryptocurrency holdings or 2) borrowed cryptocurrency (e.g., via collateralized loans). The use of a variable non-fungible token introduces a mechanism for providing a new funding mechanism (and payment instrument) for transactions that occur on smart contract platforms such as lines of credit.

As described herein, a variable non-fungible token is a non-fungible token that includes variable metadata. For example, the non-fungible token may have a smart contract that is capable of adapting and changing metadata for the non-fungible token in response to external events and data. For example, a non-fungible token may be differentiated from another through a 1-of-1 tokenID and its unique contract address. From there, metadata such as images, video files, and/or other data may be stored. However, in conventional non-fungible tokens, the metadata attached to them is fixed upon the non-fungible token being minted on a blockchain. In contrast, a variable non-fungible token allows for changes in the metadata to be triggered by a smart contract. For example, the system may encode automatic changes within the non-fungible token's smart contract, which provides instructions to the underlying non-fungible token regarding when and how its metadata should change.

In some embodiments, the variable non-fungible token may represent a token standard that has properties that represent a balance, similar to that of traditional credit card. For example, the non-fungible token may be used for managing lines of credit using smart contracts and oracles that can be deployed onto existing smart contract platforms and integrated with other smart contracts.

To provide the aforementioned functionality, the variable non-fungible token may comprise one or more properties such as metadata that can be modified (possibly multiple times per day), metadata can only be modified by permissioned account/smart contract addresses, tokens that are specific to an account on a blockchain and linked to an identity, and/or token holders (e.g., user 102) cannot transfer the token to any address. The tokens can be used as a form of payment (means of exchange) and are interoperable with other smart contracts. Payments using the token may create a liability on the borrower (e.g., user 102). Additionally, token metadata may be stored off-chain, and the system may use oracles (e.g., oracle 128 and oracle 130) to represent the data on-chain and/or receive external data for adapting and changing metadata for the non-fungible token.

User 102, lender 104, and/or receiver 106 may interact via one or more user-specific digital storage resource applications (e.g., digital wallets). For example, the digital wallet may comprise a repository that allows users to store, manage, and trade their cryptocurrencies and assets, interact with blockchains, and/or conduct blockchain functions using one or more applications. The digital wallet may be specific to a given blockchain protocol or may provide access to multiple blockchain protocols. In some embodiments, the system may use various types of wallets such as hot wallets and cold wallets. Hot wallets are connected to the internet while cold wallets are not. Most digital wallet holders hold both a hot wallet and a cold wallet. Hot wallets are most often used to perform blockchain functions, while a cold wallet is generally used for managing a user account and may have no connection to the internet.

Ecosystem 100 may include user-specific digital storage resource applications. For example, user-specific digital storage resource application 110 may comprise a digital wallet for user 102. User-specific digital storage resource application 110 may comprise a private key for a variable non-fungible token (e.g., a variable non-fungible token corresponding to smart contract 126).

Ecosystem 100 includes user-specific digital storage resource application 112, which may comprise a multi-signature digital wallet application. The multi-signature digital wallet application may use a multi-party computation ("MPC") system. MPC involves the use of multiple parties, each of which holds respective private data that may be used to evaluate a computation without ever revealing any of the private data held by each party. For example, each party of the multiple parties may possess private data (e.g., $d_1, d_2, \ldots, d_N$). Together, the parties may use their respective private data to compute a value of a public function (e.g., $F(d_1, d_2, \ldots, d_N)$). While the private data is used to compute a value based on the function, the private data is kept private during that process.

The use of an MPC-based key lessens the risk involved with the loss of a private key and/or the private key being accessed by unauthorized parties. For example, conventional key-share systems rely on a public-private key configuration where the security of the system is tied to the private key remaining private. In some cases, these keys are stored in various user-specific digital storage resource applications (or digital wallets).

Ecosystem 100 includes user-specific digital storage resource application 114, which may comprise a digital wallet application for lender 104. Ecosystem 100 includes user-specific digital storage resource application 116, which may comprise a digital wallet application for receiver 106. User-specific digital storage resource application 114 and user-specific digital storage resource application 116 may be used to interact with smart contract 126. Smart contract 126 in some embodiments may comprise a plurality of smart contracts. Smart contract 126 may be used to provide a plurality of functions such as underwriting transactions (or extending lines of credit), minting variable non-fungible tokens, managing non-fungible tokens, authorizing transactions, providing settlement actions, and/or performing bill payment functions.

Smart contract 126 may allow issuers to settle using cash off-chain. For example, issuers may trigger an inter-bank transfer upon receiving the settlement request in smart contract 126. User-specific digital storage resource applications 110-116 may then send or receive payments/transfers between transacting parties (e.g., borrowers, lenders, and receivers).

For example, an issuer wallet (e.g., user-specific digital storage resource application 112) for settling payments with receivers (e.g., receiver 106) and enable issuers to send crypto assets (e.g., USDC, Bitcoin, private fungible tokens) to receivers (e.g., user-specific digital storage resource applications 116). In some embodiments, user-specific digital storage resource application 112 may enable direct funding by the issuer, or via an omnibus account. For example, ecosystem 100 may provide a mechanism for issuers to settle using private tokens (e.g., fungible ERC-20 token) rather than USDC or Bitcoin. Smart contract 126 may have a smart contract function for merchants to redeem private tokens for fiat (e.g., USD), cryptocurrency (e.g., Bitcoin), or stablecoins (e.g., USDC). The system may use a multisig wallet (e.g., user-specific digital storage resource application 112) to manage Bill Pay on the borrower's (e.g., user 102) account.

For example, smart contract 126 and/or code deployed on a decentralized compute platform like Ethereum may be used for underwriting credit applications. In such cases, user 102 may submit personal information into the smart contract 126. Smart contract 126 may use an oracle (e.g., oracle 128 and/or oracle 130) to utilize other off-chain creditworthiness data for underwriting a credit application (e.g., to generate outputs of the underwriting process that would be an approval decision, credit line amount, interest rate, rewards, etc.). In some embodiments, the underwriting process may be done off-chain, and the system may use oracles (e.g., oracle 128 and/or oracle 130) to represent underwriting results and outputs on-chain.

Oracles 128 and/or oracle 130 may receive data streams comprising off-chain information. As referred to herein, "a data stream" may refer to data that is received from a data source that is indexed or archived by time. This may include streaming data (e.g., as found in streaming media files) or may refer to data that is received from one or more sources over time (e.g., either continuously or in a sporadic nature). A data stream segment may refer to a state or instance of the data stream. For example, a state or instance may refer to a current set of data corresponding to a given time increment or index value. For example, the system may receive time series data as a data stream. A given increment (or instance) of the time series data may correspond to a data stream segment. Smart contract 126 may receive each instance of data (e.g., as passed through and/or filtered by oracle 128 and/or oracle 130) in order to determine whether or not a blockchain function and/or dynamic update to metadata for the variable non-fungible token is triggered.

In some embodiments, the system may receive off-chain characteristics via the data stream. As referred to herein, an "off-chain characteristic" includes any data that is stored off-chain. In contrast, an "on-chain characteristic" includes any data or characteristic that is stored on-chain. An off-chain characteristic may comprise a metadata property such as a balance of a line of credit, an account the token is linked to, maximum credit line, current balance, interest rate, etc.

In some embodiments, oracles 128 and/or oracle 130 may receive data streams from an off-chain resource (e.g., resource 132 and resource 134). Resource 132 and/or resource 134 may comprise a dedicated and/or centralized resource that is controlled and/or operated by lender 104. For example, resource 132 and resource 134 may comprise storage locations that both transmit data streams as well as store metadata referenced by smart contract 126. As the metadata itself is stored at a centralized location (e.g., as identified by smart contract 126) it may be updated by the non-transferable smart contract address in a secured manner. That is, the metadata is stored off-chain and at a secure location, which allows for high transaction and updates speeds for high volumes of data, received from the centralized location. While the non-transferable attributes of the non-fungible token ensure that only a user for which the non-fungible token was minted may access the centralized location.

Oracles 128 and/or oracle 130 may comprise various architecture. For example, oracle 128 and/or oracle 130 may constitute an input oracle, an output oracle, cross-chain oracles, and/or computing oracles. An input oracle fetches data from the real-world (e.g., off-chain) and delivers it onto a blockchain network for smart contract consumption. Output oracles allow smart contracts to send commands to off-chain systems that trigger them to execute certain actions (e.g., informing a banking network to make a payment, adjusting metadata, and/or transmitting a confirmation of payment to a point-of-sale device (e.g., for receiver 106)). Cross-chain oracles enable interoperability for moving both data and assets between blockchains, such as using data on one blockchain to trigger an action on another or bridging assets cross-chain so they can be used outside the native blockchain they were issued on. Computing oracles use secure off-chain computation to provide decentralized services that are impractical to do on-chain due to technical, legal, and/or financial constraints. For example, ecosystem 100 may use a computing oracle to perform verifications and validations of data received from resource 132 and/or resource 134. For example, the various oracles may allow for data to be communicable between the first smart contract and the off-chain resource using a blockchain oracle.

In some embodiments, resource 132 and/or resource 134 may store metadata for smart contract 126. In conventional systems, non-fungible tokens may point to either an Inter-Planetary File System ("IPFS") hash or an HTTP URL on the web. The variable non-fungible token may specify a standard JavaScript Object Notation ("JSON") format for encoding metadata. Smart contract 126 may then store as a Universal Resource Identifier ("URI") as storing a JSON would be both costly and resource-intensive. However, the URI string leads to a site (e.g., resource 132 and/or resource 134) where the token's JSON description can be found.

For example, in some embodiments, they system may generate encoded instructions for the non-fungible token using a JSON format. The system may then store, at an off-chain resource, the encoded instructions. The system may then determine a location of the off-chain resource (e.g., resource 132 and/or resource 134), wherein the off-chain resource comprises a centralized data storage source for storing the first metadata property. The system may then generate a URI for the off-chain resource and encode the URI in the non-fungible token.

The non-fungible token may comprise one or more "metadata properties." As referred to herein, a metadata property may comprise a current state or instance. The metadata property may reflect a dynamic property of the non-fungible token such as a balance of a line of credit, an account the token is linked to, maximum credit line, current balance, interest rate, etc. The non-fungible token may also include static metadata properties such as a user, account, and/or digital wallet to which the token is link. For example, once minted, the token would be transferred to the borrowing user's cryptographic public key/address (e.g., digital wallet), after which, the token may be non-transferable as indicated by the static metadata property.

After creation, blockchain functions may be conducted by smart contract 126 for authorizing transaction requests and settling payments between the issuer (e.g., lender 104) and the receiver (e.g., receiver 106). Receivers'/sellers' payment requests can be made into the smart contract with the borrower's (e.g., user 102) public key. User authorizations (e.g., from user 102) would be made using their private keys. For example, users (e.g., user 102) may receive authorization request notifications (e.g., via user interface 400 (FIG. 4)) where user 102 would approve using a private key.

Issuers' authorizations decisions would be made through a smart contract function that would approve or decline based on their credit/fraud/etc. policies. Oracles 128 and/or 130 may enforce these policies and/or may use on-chain smart contracts for performing anti-money laundering and/or know your customer checks on the receiver/seller. Smart contract 126 may also include the capability to set a time period to reclaim payments (for chargebacks or re-bills due to disputes/fraud). For example, the system may determine an encoded instruction for the smart contract, wherein the encoded instruction comprises a time period for use of or a specific use of the non-fungible token. Approved authorizations would trigger the transfer of funds from the issuer's wallet to the receiver's/seller's wallet.

Figure 2:
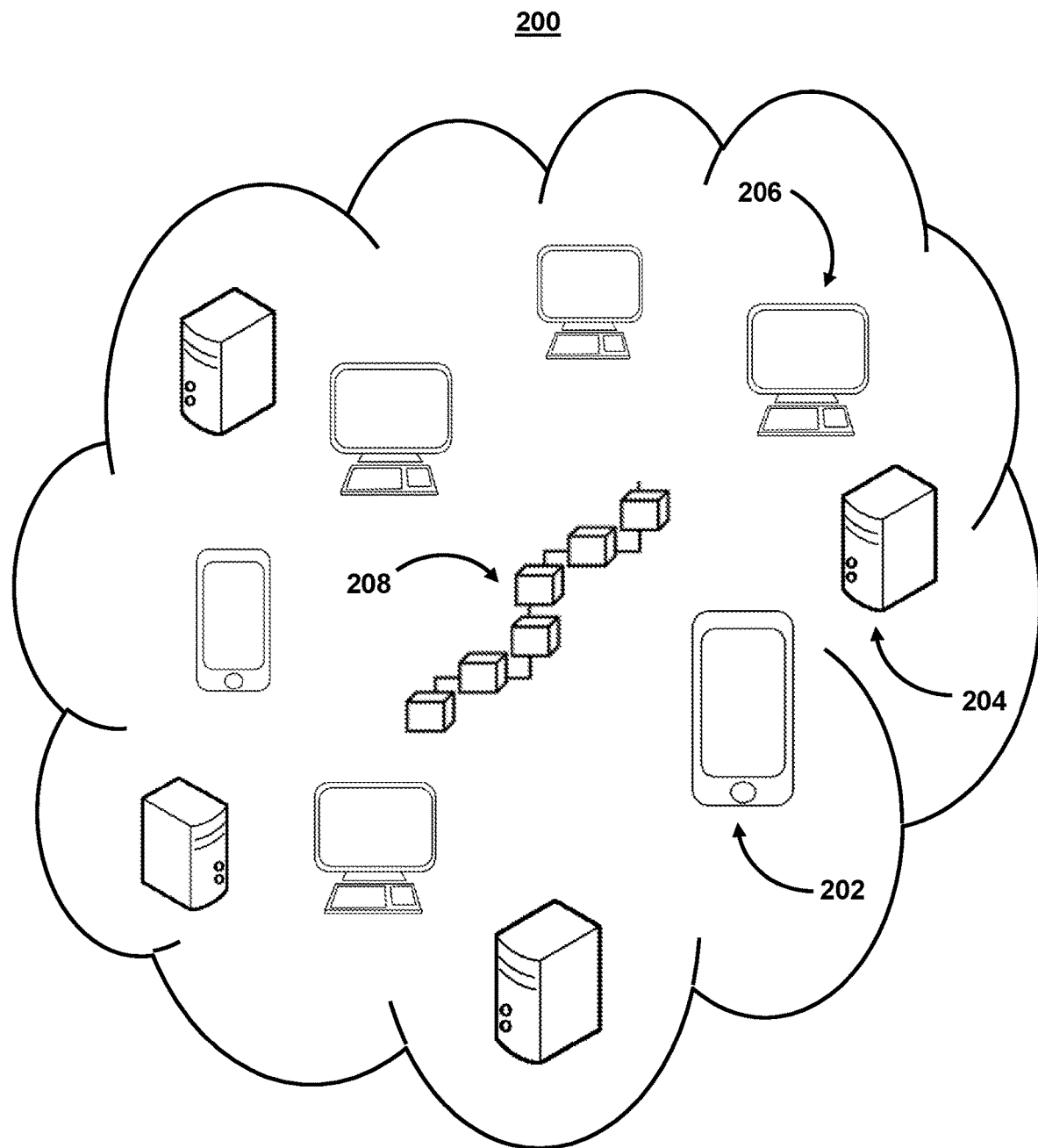
FIG. 2 shows an illustrative diagram for a blockchain network in which a variable non-fungible token may be used, in accordance with one or more embodiments.

FIG. 2 shows an illustrative diagram for a decentralized environment for performing blockchain functions, in accordance with one or more embodiments. For example, the diagram presents various components that may be used to facilitate blockchain functions related to variable non-fungible tokens in some embodiments.

As shown in FIG. 2, system 200 may include multiple user devices (e.g., user device 202, user device 202, and/or user device 206). For example, system 200 may comprise a distributed state machine in which each of the components in FIG. 2 acts as a client of system 200. For example, system 200 (as well as other systems described herein) may comprise a large data structure that holds not only all accounts and balances but also a state machine, which can change from block to block according to a predefined set of rules and execute arbitrary machine code. The specific rules of changing state from block to block may be maintained by a virtual machine (e.g., a computer file implemented on and/or accessible by a user device, which behaves like an actual computer) for the system. For example, system 200 may interact with, and facilitate the function of, blockchain 208.

It should be noted that, while shown as a smartphone, a personal computer, and a server in FIG. 2, the user devices may be any type of computing device, including, but not limited to, a laptop computer, a tablet computer, a hand-held computer, and/or other computing equipment (e.g., a server), including "smart," wireless, wearable, and/or mobile devices. It should be noted that embodiments describing system 200 performing a blockchain function may equally be applied to, and correspond to, an individual user device (e.g., user device 202, user device 208, and/or user device 210) performing the blockchain function. That is, system 200 may correspond to the user devices (e.g., user device 202, user device 204, and/or user device 206) collectively or individually.

Each of the user devices may be used by the system to conduct blockchain functions and/or contribute to the use of variable non-fungible tokens. As referred to herein, "blockchain functions" may comprise any operations including and/or related to blockchains and blockchain technology. For example, blockchain functions may include conducting transactions, querying a distributed ledger, generating additional blocks for a blockchain, transmitting communications-related nonfungible tokens, performing encryption/decryption, exchanging public/private keys, and/or other operations related to blockchains and blockchain technology. In some embodiments, a blockchain function may comprise the creation, modification, detection, and/or execution of a smart contract or program stored on a blockchain. For example, a smart contract may comprise a program stored on a blockchain that is executed (e.g., automatically, without any intermediary involvement or time loss) when one or more predetermined conditions are met. In some embodiments, a blockchain function may comprise the creation, modification, exchange, and/or review of a token (e.g., a digital blockchain-specific asset), including a nonfungible token. A nonfungible token may comprise a token that is associated with a good, a service, a smart contract, and/or other content that may be verified by, and stored using, blockchain technology.

In some embodiments, blockchain functions may also comprise actions related to mechanisms that facilitate other blockchain functions (e.g., actions related to metering activities for blockchain functions on a given blockchain network). For example, Ethereum, which is an open-source, globally decentralized computing infrastructure that executes smart contracts, uses a blockchain to synchronize and store the system's state changes. Ethereum uses a network-specific cryptocurrency called ether to meter and constrain execution resource costs. The metering mechanism is referred to as "gas." As the system executes a smart contract, the system accounts for every blockchain function (e.g., computation, data access, transaction, etc.). Each blockchain function has a predetermined cost in units of gas (e.g., as determined based on a predefined set of rules for the system). When a blockchain function triggers the execution of a smart contract, the blockchain function may include an amount of gas that sets the upper limit of what can be consumed in running the smart contract. The system may terminate execution of the smart contract if the amount of gas consumed by computation exceeds the gas available in the blockchain function. For example, in Ethereum, gas comprises a mechanism for allowing Turing-complete computation while limiting the resources that any smart contract and/or blockchain function may consume.

In some embodiments, gas may be obtained as part of a blockchain function (e.g., a purchase) using a network-specific cryptocurrency (e.g., ether in the case of Ethereum). The system may require gas (or the amount of the network-specific cryptocurrency corresponding to the required amount of gas) to be transmitted with the blockchain function as an earmark to the blockchain function. In some embodiments, gas that is earmarked for a blockchain function may be refunded back to the originator of the blockchain function if, after the computation is executed, an amount remains unused.

As shown in FIG. 2, one or more user devices may include a digital wallet (e.g., digital wallet 204) used to perform blockchain functions. As shown in FIG. 2, one or more user devices may include a private key (e.g., key 212) and/or digital signature. For example, system 200 may use cryptographic systems for conducting blockchain functions related to variable non-fungible token. For example, system 200 may use public-key cryptography, which features a pair of digital keys (e.g., which may comprise strings of data). In such cases, each pair comprises a public key (e.g., which may be public) and a private key (e.g., which may be kept private). System 200 may generate the key pairs using cryptographic algorithms (e.g., featuring one-way functions). System 200 may then encrypt a message (or other blockchain function) using an intended receiver's public key such that the encrypted message may be decrypted only with the receiver's corresponding private key. In some embodiments, system 200 may combine a message with a private key to create a digital signature on the message. For example, the digital signature may be used to verify the authenticity of blockchain functions. As an illustration, when conducting blockchain functions, system 200 may use the digital signature to prove to every node in the system that it is authorized to conduct the blockchain functions.

For example, system 200 may comprise a plurality of nodes for the blockchain network. Each node may correspond to a user device (e.g., user device 202). A node for a blockchain network may comprise an application or other software that records and/or monitors peer connections to other nodes and/or miners for the blockchain network. For example, a miner comprises a node in a blockchain network that facilitates blockchain functions by verifying blockchain functions on the blockchain, adding new blocks to the existing chain, and/or ensuring that these additions are accurate. The nodes may continually record the state of the blockchain and respond to remote procedure requests for information about the blockchain.

For example, user device 202 may request a blockchain function (e.g., conduct a transaction). The blockchain function may be authenticated by user device 204 and/or another node (e.g., a user device in the community network of system 200). For example, using cryptographic keys, system 200 may identify users and give access to their respective user accounts (e.g., corresponding digital wallets) within system 200. Using private keys (e.g., known only to the respective users) and public keys (e.g., known to the community network), system 200 may create digital signatures to authenticate the users.

Following an authentication of the blockchain function, the blockchain function may be authorized. For example, after the blockchain function is authenticated between the users, system 200 may authorize the blockchain function prior to adding it to the blockchain. System 200 may add the blockchain function to blockchain 208. System 200 may perform this based on a consensus of the user devices within system 200. For example, system 200 may rely on a majority (or other metric) of the nodes in the community network (e.g., user device 202, user device 204, and/or user device 206) to determine if the blockchain function is valid. In response to validation of the block, a node user device (e.g., user device 202, user device 204, and/or user device 206) in the community network (e.g., a miner) may receive a reward (e.g., in a given cryptocurrency) as an incentive for validating the block.

To validate the blockchain function, system 200 may use one or more validation protocols and/or validation (or consensus) mechanisms. For example, system 200 may use a POW mechanism in which a user device must provide evidence that it performed computational work to validate a blockchain function and thus this mechanism provides a manner for achieving consensus in a decentralized manner as well as preventing fraudulent validations. For example, the POW may involve iterations of a hashing algorithm. The user device that is successful aggregates and records blockchain functions from a mempool (e.g., a collection of all valid blockchain functions waiting to be confirmed by the blockchain network) into the next block. Alternatively or additionally, system 200 may use a POS mechanism in which a user account (e.g., corresponding to a node on the blockchain network) is required to have, or "stake," a predetermined amount of tokens in order for system 200 to recognize it as a validator in the blockchain network.

In response to validation of the block, the block is added to blockchain 208, and the blockchain function is completed. For example, to add the blockchain function to blockchain 208, the successful node (e.g., the successful miner) encapsulates the blockchain function in a new block before transmitting the block throughout system 200.

Figure 3:
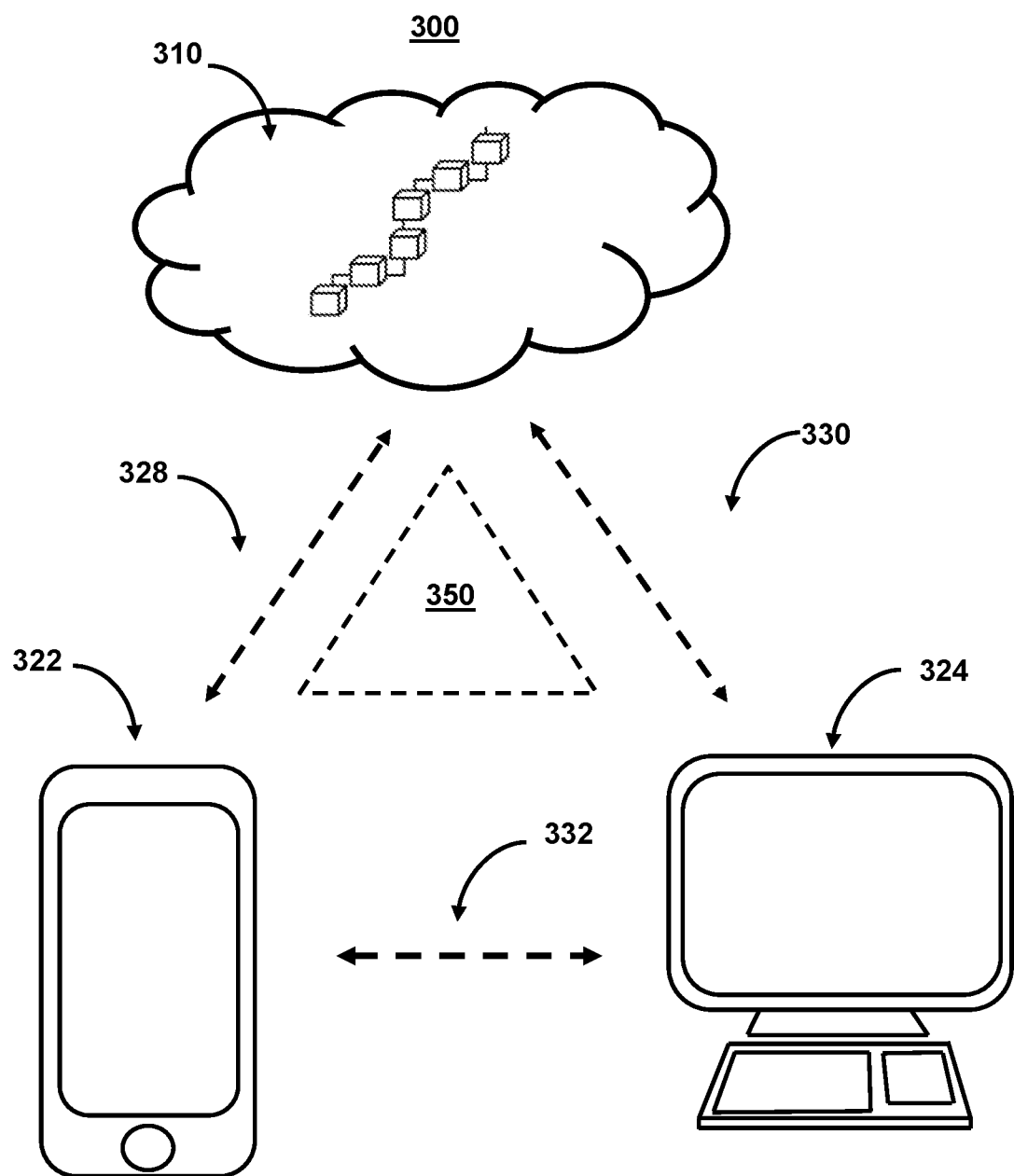
FIG. 3 shows illustrative components for a system used in facilitating blockchain functions related to a variable non-fungible token, in accordance with one or more embodiments.

FIG. 3 shows illustrative components for a system used in facilitating blockchain functions related to a variable non-fungible token, in accordance with one or more embodiments. As shown in FIG. 3, system 300 may include mobile device 322 and user terminal 324. While shown as a smartphone and personal computer, respectively, in FIG. 3, it should be noted that mobile device 322 and user terminal 324 may be any computing device, including, but not limited to, a laptop computer, a tablet computer, a hand-held computer, and/or other computer equipment (e.g., a server), including "smart," wireless, wearable, and/or mobile devices. FIG. 3 also includes cloud components 310. Cloud components 310 may alternatively be any computing device as described above, and may include any type of mobile terminal, fixed terminal, or other device. For example, cloud components 310 may be implemented as a cloud computing system, and may feature one or more component devices. It should also be noted that system 300 is not limited to three devices. Users may, for instance, utilize one or more devices to interact with one another, one or more servers, or other components of system 300. It should be noted, that, while one or more operations are described herein as being performed by particular components of system 300, these operations may, in some embodiments, be performed by other components of system 300. As an example, while one or more operations are described herein as being performed by components of mobile device 322, these operations may, in some embodiments, be performed by components of cloud components 310. In some embodiments, the various computers and systems described herein may include one or more computing devices that are programmed to perform the described functions. Additionally, or alternatively, multiple users may interact with system 300 and/or one or more components of system 300. For example, in one embodiment, a first user and a second user may interact with system 300 using two different components.

With respect to the components of mobile device 322, user terminal 324, and cloud components 310, each of these devices may receive content and data via input/output (hereinafter "I/O") paths. Each of these devices may also include processors and/or control circuitry to send and receive commands, requests, and/or other suitable data using the I/O paths. The control circuitry may comprise any suitable processing, storage, and/or input/output circuitry. Each of these devices may also include a user input interface and/or user output interface (e.g., a display) for use in receiving and displaying data. For example, as shown in FIG. 3, both mobile device 322 and user terminal 324 include a display upon which to display data (e.g., conversational response, queries, and/or notifications).

Additionally, as mobile device 322 and user terminal 324 are shown as touchscreen smartphones, these displays also act as user input interfaces. It should be noted that in some embodiments, the devices may not have user input interfaces or displays, and may instead receive and display content using another device (e.g., a dedicated display device such as a computer screen, and/or a dedicated input device such as a remote control, mouse, voice input, etc.). Additionally, the devices in system 300 may run an application (or another suitable program). The application may cause the processors and/or control circuitry to perform operations related to generating dynamic conversational replies, queries, and/or notifications.

Each of these devices may also include electronic storages. The electronic storages may include non-transitory storage media that electronically stores information. The electronic storage media of the electronic storages may include one or both of (i) system storage that is provided integrally (e.g., substantially non-removable) with servers or client devices, or (ii) removable storage that is removably connectable to the servers or client devices via, for example, a port (e.g., a USB port, a firewire port, etc.) or a drive (e.g., a disk drive, etc.). The electronic storages may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. The electronic storages may include one or more virtual storage resources (e.g., cloud storage, a virtual private network, and/or other virtual storage resources). The electronic storages may store software algorithms, information determined by the processors, information obtained from servers, information obtained from client devices, or other information that enables the functionality as described herein.

FIG. 3 also includes communication paths 328, 330, and 332. Communication paths 328, 330, and 332 may include the Internet, a mobile phone network, a mobile voice or data network (e.g., a 5G or LTE network), a cable network, a public switched telephone network, or other types of communications networks or combinations of communications networks. Communication paths 328, 330, and 332 may separately or together include one or more communications paths, such as a satellite path, a fiber-optic path, a cable path, a path that supports Internet communications (e.g., IPTV), free-space connections (e.g., for broadcast or other wireless signals), or any other suitable wired or wireless communications path or combination of such paths. The computing devices may include additional communication paths linking a plurality of hardware, software, and/or firmware components operating together. For example, the computing devices may be implemented by a cloud of computing platforms operating together as the computing devices. Cloud components 310 may include the features and/or components as described in FIG. 2.

System 300 also includes API layer 350. API layer 350 may allow the system to generate summaries across different devices. In some embodiments, API layer 350 may be implemented on user device 322 or user terminal 324. Alternatively or additionally, API layer 350 may reside on one or more of cloud components 310. API layer 350 (which may be A REST or Web services API layer) may provide a decoupled interface to data and/or functionality of one or more applications. API layer 350 may provide a common, language-agnostic way of interacting with an application. Web services APIs offer a well-defined contract, called WSDL, that describes the services in terms of its operations and the data types used to exchange information. REST APIs do not typically have this contract; instead, they are documented with client libraries for most common languages, including Ruby, Java, PUP, and JavaScript. SOAP Web services have traditionally been adopted in the enterprise for publishing internal services, as well as for exchanging information with partners in B2B transactions.

API layer 350 may use various architectural arrangements. For example, system 300 may be partially based on API layer 350, such that there is strong adoption of SOAP and RESTful Web-services, using resources like Service Repository and Developer Portal, but with low governance, standardization, and separation of concerns. Alternatively, system 300 may be fully based on API layer 350, such that separation of concerns between layers like API layer 350, services, and applications are in place.

In some embodiments, the system architecture may use a microservice approach. Such systems may use two types of layers: Front-End Layer and Back-End Layer where microservices reside. In this kind of architecture, the role of the API layer 350 may provide integration between Front-End Layer and Back-End Layer. In such cases, API layer 350 may use RESTful APIs (exposition to front-end or even communication between microservices). API layer 350 may use AMQP (e.g., Kafka, RabbitMQ, etc.). API layer 350 may use incipient usage of new communications protocols such as gRPC, Thrift, etc.

In some embodiments, the system architecture may use an open API approach. In such cases, API layer 350 may use commercial or open source API platforms and their modules. API layer 350 may use a developer portal. API layer 350 may use strong security constraints applying WAF and DDoS protection, and API layer 350 may use RESTful APIs as standard for external integration.

Figure 4:
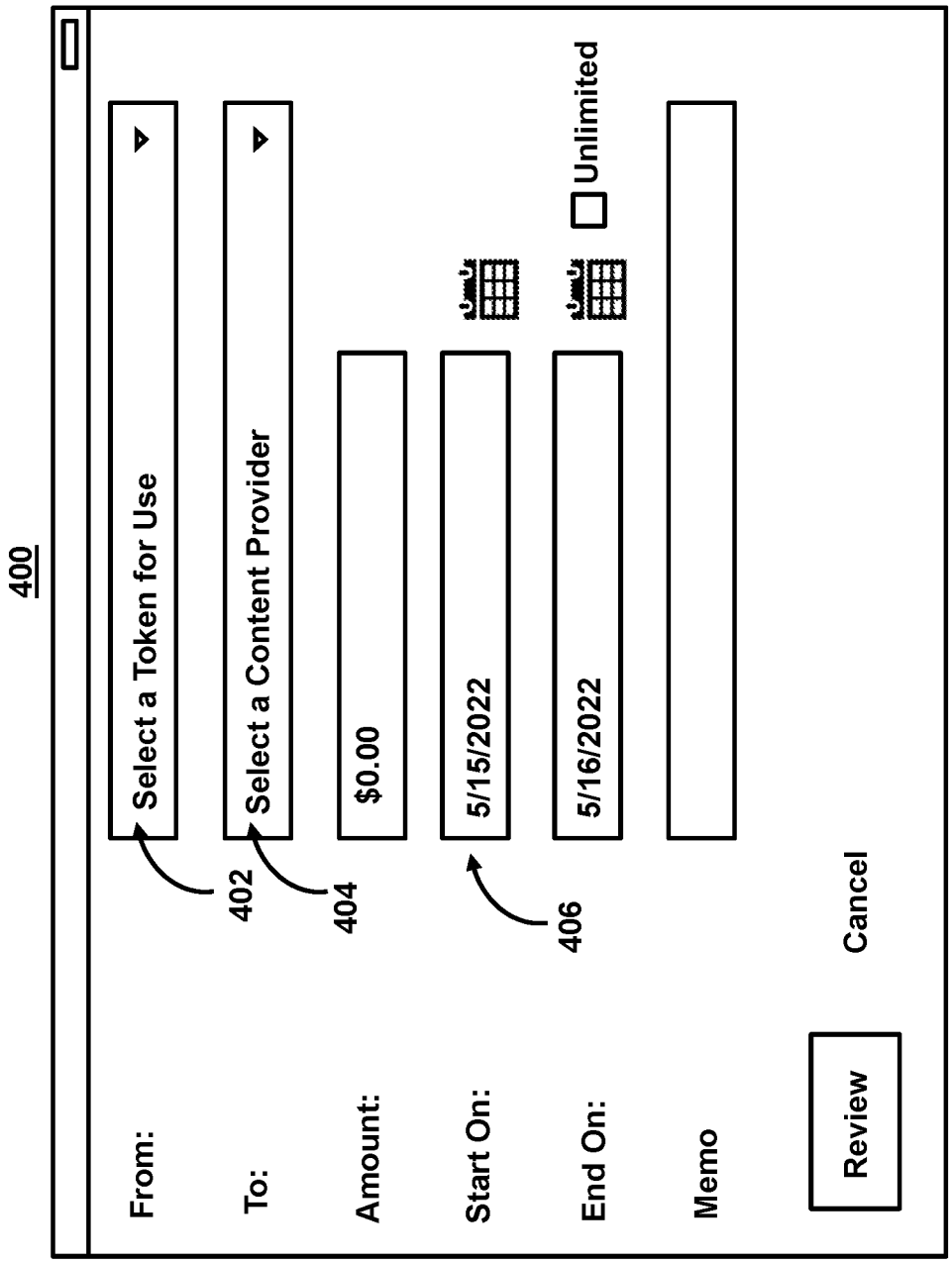
FIG. 4 shows an illustrative user interface for a menu for a user-specific digital storage resource application, in accordance with one or more embodiments.

FIG. 4 shows an illustrative user interface for a menu for a user-specific digital storage resource application, in accordance with one or more embodiments. For example, as described in FIG. 1, a user (e.g., user 102 (FIG. 1)) may attempt to perform a blockchain function (e.g., transaction) related to content provided by a content provider. To perform this blockchain function, the user may interact with a user interface.

As referred to herein, a "user interface" may comprise a human-computer interaction and communication in a device, and may include display screens, keyboards, a mouse, and the appearance of a desktop. For example, a user interface may comprise a way a user interacts with an application or a website. In some embodiments, the system may provide a user-specific digital storage resource application (e.g., a digital wallet). The user-specific digital storage resource application may include a user interface through which a user may navigate to content and/or select content related to a blockchain function. The user-specific digital storage resource application may also provide one or more icons, fields, and/or options related to performing a blockchain function and/or selecting characteristics of a blockchain function.

For example, as shown in user interface 400, the system may provide a menu that allows a user to select a variable non-fungible token, a fungible token, a token standard, and/or a user account for conducting a blockchain function via icon 402. In some embodiments, user interface 400 may generate for simultaneous displays in user interface 400, icons for the plurality of non-fungible tokens. For example, user interface 400 may generate a plurality of selectable icons corresponding to one or more non-fungible tokens.

User interface 400 may additionally include icons for selecting a content provider, merchant, etc. for interacting with during a blockchain function. For example, the system may receive a user input of icon 404 to select a content provider. Additionally, user interface 400 may include icons and/or fields (e.g., icons 406) for entering additional information related to a blockchain function.

For example, user interface 400 may allow users (e.g., user 102 (FIG. 1)) to integrate a digital wallet application with legacy systems (e.g., systems based on non-blockchain technology). Furthermore, user interface 400 may integrate blockchain functions (e.g., generating blockchain-based digital payments) and external systems using wallet-specific digital assets (e.g., variable nonfungible tokens and/or other cryptocurrencies). For example, the system may receive, from a digital wallet application on a user device, a first user input to perform an off-chain function with a first content provider (e.g., perform a payment with a merchant). The system may, in response to the first user input, determine an off-chain characteristic corresponding to the off-chain function (e.g., a price of a good or service). The system may receive a second user input selecting a first non-fungible token for satisfying the off-chain characteristic (e.g., a non-fungible token and/or other cryptocurrency account for paying for the good or service). The system may, in response to the second user input, generate a communication to an off-chain resource (e.g., lender 104 (FIG. 1)) identified by the first non-fungible token for authorization to perform the off-chain function using the first non-fungible token, wherein performing the off-chain function (e.g., performing a payment) causes an off-chain metadata property (e.g., a balance of a line of credit for the user) for the first non-fungible token to be modified. The system may, in response receiving the authorization to perform the off-chain function, receive a user approval request to perform an on-chain blockchain function corresponding to the off-chain function. The system may generate, from the first digital wallet application on the user device, a confirmation of the blockchain function in response to the user approval request, wherein the confirmation is based on a private key for the first digital wallet, and wherein the generating of a confirmation causes performance of the on-chain blockchain function and a modification of the off-chain metadata property.

As referred to herein, "content" should be understood to mean an electronically consumable user asset, such as Internet content (e.g., streaming content, downloadable content, Webcasts, etc.), video clips, audio, content information, pictures, rotating images, documents, playlists, websites, articles, books, electronic books, blogs, advertisements, chat sessions, social media content, applications, games, and/or any other media or multimedia and/or combination of the same. Content may be recorded, played, displayed, or accessed by user devices, but can also be part of a live performance. Furthermore, user generated content may include content created and/or consumed by a user. For example, user generated content may include content created by another, but consumed and/or published by the user. Content may also include any good or service that may be represented by an electronically consumable user asset (e.g., a good or service offered for sale via a website or mobile application) and/or may be related to a blockchain function (e.g., a good or service purchased via a blockchain function).

In some embodiments, user interface 400 may correspond to an application. The application may link to and/or be integrated with a user profile. The system may monitor content generated by the user to generate user profile data. As referred to herein, "a user profile" and/or "user profile data" may comprise data actively and/or passively collected about a user. For example, the user profile data may comprise content generated by the user and a user characteristic for the user. A user profile may be content consumed and/or created by a user.

User profile data may also include a user characteristic. As referred to herein, "a user characteristic" may include information about a user and/or information included in a directory of stored user settings, preferences, and information for the user. For example, a user profile may have the settings for the user's installed programs and operating system. In some embodiments, the user profile may be a visual display of personal data associated with a specific user, or a customized desktop environment. In some embodiments, the user profile may be digital representation of a person's identity. The data in the user profile may be generated based on the system actively or passively monitoring.

For example, user interface 400 may enable automated calculation and scheduling of required payments based on the outstanding balance and interest rate. User interface 400 may also enable bill payments from the borrower (e.g., user 102 (FIG. 1)) via deposits into a wallet linked to user interface 400 and enable payment collection by the issuer via withdrawals from the wallet. In turn, the system may update (credit) the line of credit balance with payment and interest amounts. When doing so, the system may transmit metadata updates. For example, as a receiver wallet (e.g., user-specific digital storage resource application 112) collects payments, a smart contract may generate instructions for managing LoC token credit lines and balances, decreasing available credit and increase balances due—account charges, interest charges, credit line decrease, annual fees, etc., and increasing available credit and decrease balances due—bill payment made, refund, credit line increase, rewards, etc.

Figure 5:
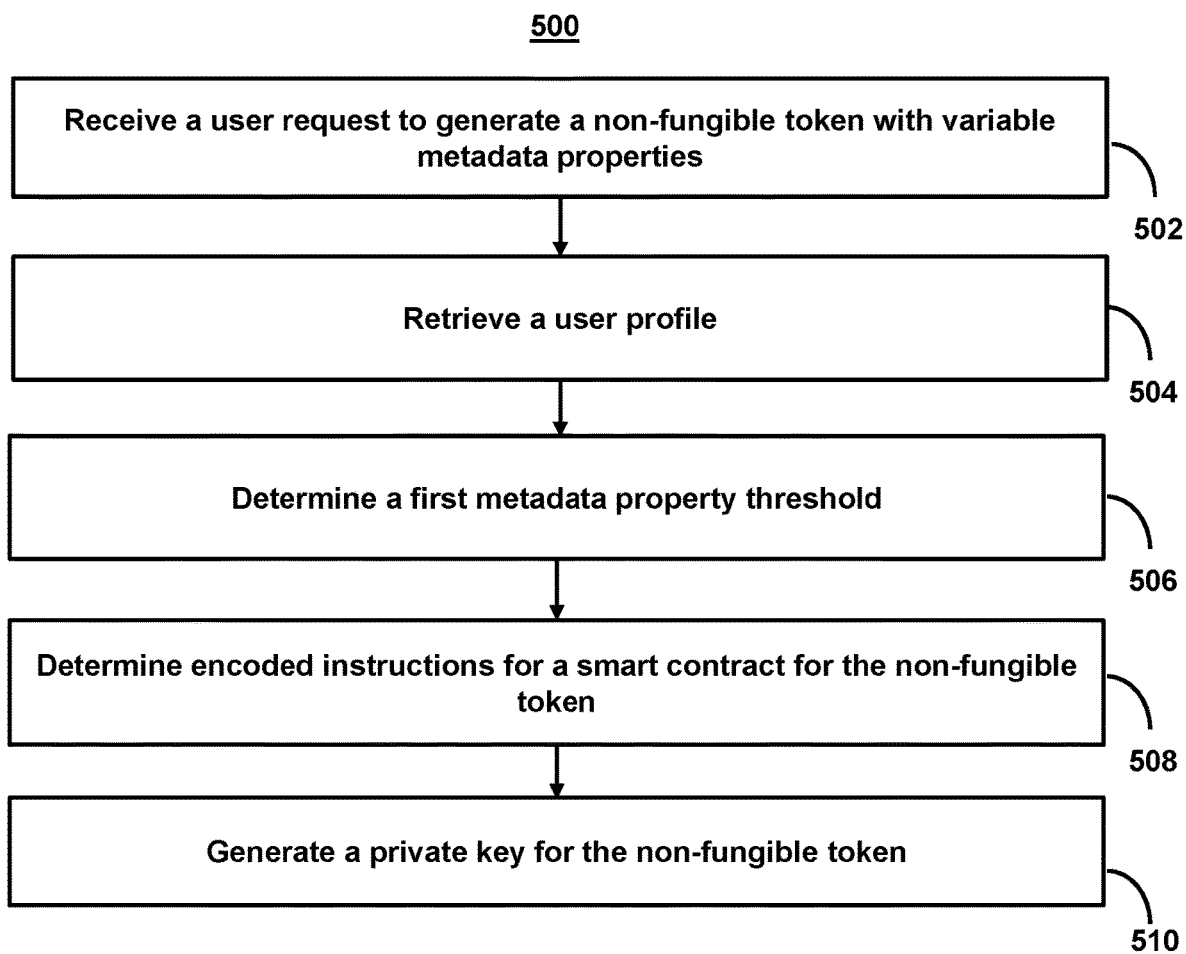
FIG. 5 shows a flowchart of the steps involved in minting non-fungible tokens with variable metadata properties, in accordance with one or more embodiments.

FIG. 5 shows a flowchart of the steps involved in minting non-fungible tokens with variable metadata properties, in accordance with one or more embodiments. For example, process 500 may mint non-fungible tokens with variable metadata properties linked to designated off-chain resources. For example, when making blockchain-based payments today, users are limited to two types of funding sources: their cryptocurrency holdings or borrowed cryptocurrency (via collateralized loans). The use of a variable non-fungible token enables a new funding mechanism (and payment instrument) for transactions that occur on smart contract platforms such as lines of credit.

At step 502, process 500 (e.g., using one or more components described above) receives a user request to generate a non-fungible token with variable metadata properties. For example, the system may receive, from a user-specific digital storage resource application on a user device, a user request to generate a non-fungible token with variable metadata properties. For example, the variable non-fungible token may comprise a new type of token standard that has properties that represent a balance, similar to that of credit card balances today. That is, as opposed to a non-fungible token that is linked to a specific item (e.g., located at an Internet address), the non-fungible token may represent variable data (e.g., data that is updated by a third-party entity). For example, the variable metadata properties may be determined based on metadata updates performed by an off-chain resource, wherein the metadata updates are provided via an oracle controlled by the off-chain resource. For example, the variable non-fungible token may represent a balance of credit that is updated by a third party (e.g., a credit provider). The third party may both perform updates to the balance as well as control the data source of the updates (e.g., an oracle).

For example, the system may receive, from the user-specific digital wallet application on the user device, a user request to use the non-fungible token to perform a blockchain function. The system may, in response to performing the blockchain function, cause the current state of the first metadata property to be modified. For example, as opposed to a conventional non-fungible token, the system may update a metadata property, which fundamental differs from conventional non-fungible tokens.

At step 504, process 500 (e.g., using one or more components described above) retrieves a user profile. For example, the system may, in response to the user request, retrieve a user profile corresponding to the user-specific digital storage resource application. For example, the user profile may correspond to a given user account with a given credit issuer.

At step 506, process 500 (e.g., using one or more components described above) determines a first metadata property threshold. For example, the system may determine, based on the user profile, a first metadata property threshold (e.g., a credit limit) for a first metadata property of the non-fungible token. For example, in response to receiving the user request to generate the non-fungible token with variable metadata properties, the system may determine an identity of a user corresponding to the user-specific digital wallet application on a user device. The system may determine the first metadata property threshold based on the identity. For example, the system may link a non-fungible token (and properties thereof such as a credit limit) to determine an identity.

At step 508, process 500 (e.g., using one or more components described above) determines encoded instructions for a smart contract for the non-fungible token. For example, the system may determine a first encoded instruction for a first smart contract for the non-fungible token, wherein the first encoded instruction comprises a first automatic response to a first type of blockchain function (e.g., a request to use the credit line) of a plurality of types of blockchain functions interacting with the first smart contract, wherein the first automatic response comprises a comparison of a current state (e.g., a current balance of a line of credit) of the first metadata property against the first metadata property threshold, wherein the current state is stored off-chain. For example, the system may store metadata for the non-fungible token off-chain. In a conventional system, the use of off-chain storage would fundamentally alter the usefulness of the non-fungible token. For example, if the metadata is stored off-chain it could be altered within any on-chain notification. However, as the off-chain data is controlled by a secure data source, the system may benefit from this architecture without creating a security risk.

The system may use different encoding formats for encoding the instructions. For example, the system may encode the first encoded instruction and the second encoded instruction in the non-fungible token using a JSON format. The system may store, at an off-chain resource, the first encoded instruction and the second encoded instruction. The system may determine a location of the off-chain resource, wherein the off-chain resource comprises a centralized data storage source for storing the first metadata property, wherein data is communicable between the first smart contract and the off-chain resource using a blockchain oracle. The system may generate a URI for the off-chain resource. The system may encode the URI in the non-fungible token.

The system may also determine various other encoded instructions. For example, the system may additionally or alternatively determine a second encoded instruction for the first smart contract, wherein the second encoded instruction comprises a second automatic response to the first type of blockchain function interacting with the first smart contract, wherein the second automatic response comprises querying a non-transferable smart contract address for the current state. For example, the non-transferable smart contract address for the current state may indicate an off-chain resource for obtaining a current state of a metadata property.

The system may additionally or alternatively determine a third encoded instruction for the first smart contract, wherein the third encoded instruction comprises a restriction on transferability of the non-fungible token. The system may determine a third automatic response to a second type of blockchain function (e.g., an exchange or change of ownership of the non-fungible token) of the plurality of types of blockchain functions interacting with the first smart contract, wherein the third automatic response comprises a termination of any blockchain functions of the second type.

The system may additionally or alternatively determine a fourth encoded instruction for the first smart contract, wherein the fourth encoded instruction comprises a list of smart contract addresses that may interact with the first smart contract. The system may determine a fourth automatic response, wherein the fourth automatic response comprises a termination of any blockchain functions involving a smart contract address not on the list. For example, the system may limit blockchain functions involving the non-fungible token to a subset of known smart contract addresses.

The system may additionally or alternatively determine a fifth encoded instruction for the first smart contract, wherein the fifth encoded instruction comprises a criterion for modifying the first metadata property threshold. The system may determine a fifth automatic response, wherein the fifth automatic response comprises monitoring for the criterion. For example, in addition to using smart contracts to determine whether a metadata property threshold is met, the system may also use smart contracts to automatically update the metadata property threshold. The system may in such cases use a smart contract to monitor for specific criteria. In some embodiments, the smart contract may indicate specific oracles (or oracle data streams) to monitor for the criteria. The smart contract may also indicate what criteria (e.g., a time period, a threshold number of uses of the non-fungible token, and/or other off-chain data (e.g., a bank account balance of a user)).

The system may additionally or alternatively determine a sixth encoded instruction for the first smart contract, wherein the sixth encoded instruction comprises a time period for use of the non-fungible token. The system may determine a sixth automatic response, wherein the sixth automatic response comprises a termination of any blockchain functions occurring outside the time period. For example, the system may limit the use of the non-fungible token to a certain lifetime. The time period comprising the lifetime may be encoded into the first smart contract at minting.

The system may also generate a smart contract to govern the non-fungible token. For example, the system may generate the first smart contract comprising the first encoded instruction and the second encoded instruction. The system may determine a first smart contract address for the first smart contract.

At step 510, process 500 (e.g., using one or more components described above) generates a private key for the non-fungible token. For example, the system may cause to be generated, at the user-specific digital storage resource application on the user device, a private key for the non-fungible token. For example, the system may generate a public key for the non-fungible token, wherein the public key corresponds to the user-specific digital wallet application on the user device. The system may transmit a confirmation of the creation of the non-fungible token to an off-chain resource, wherein the off-chain resource controls an oracle for providing metadata updates to the non-fungible token. For example, the system may not only generate the non-fungible token, but the system may also transmit a confirmation to an off-chain resource (e.g., a credit provider). By doing so, the off-chain resource may generate authorizations of blockchain functions involving the non-fungible token.

It is contemplated that the steps or descriptions of FIG. 5 may be used with any other embodiment of this disclosure. In addition, the steps and descriptions described in relation to FIG. 5 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 5.

Figure 6:
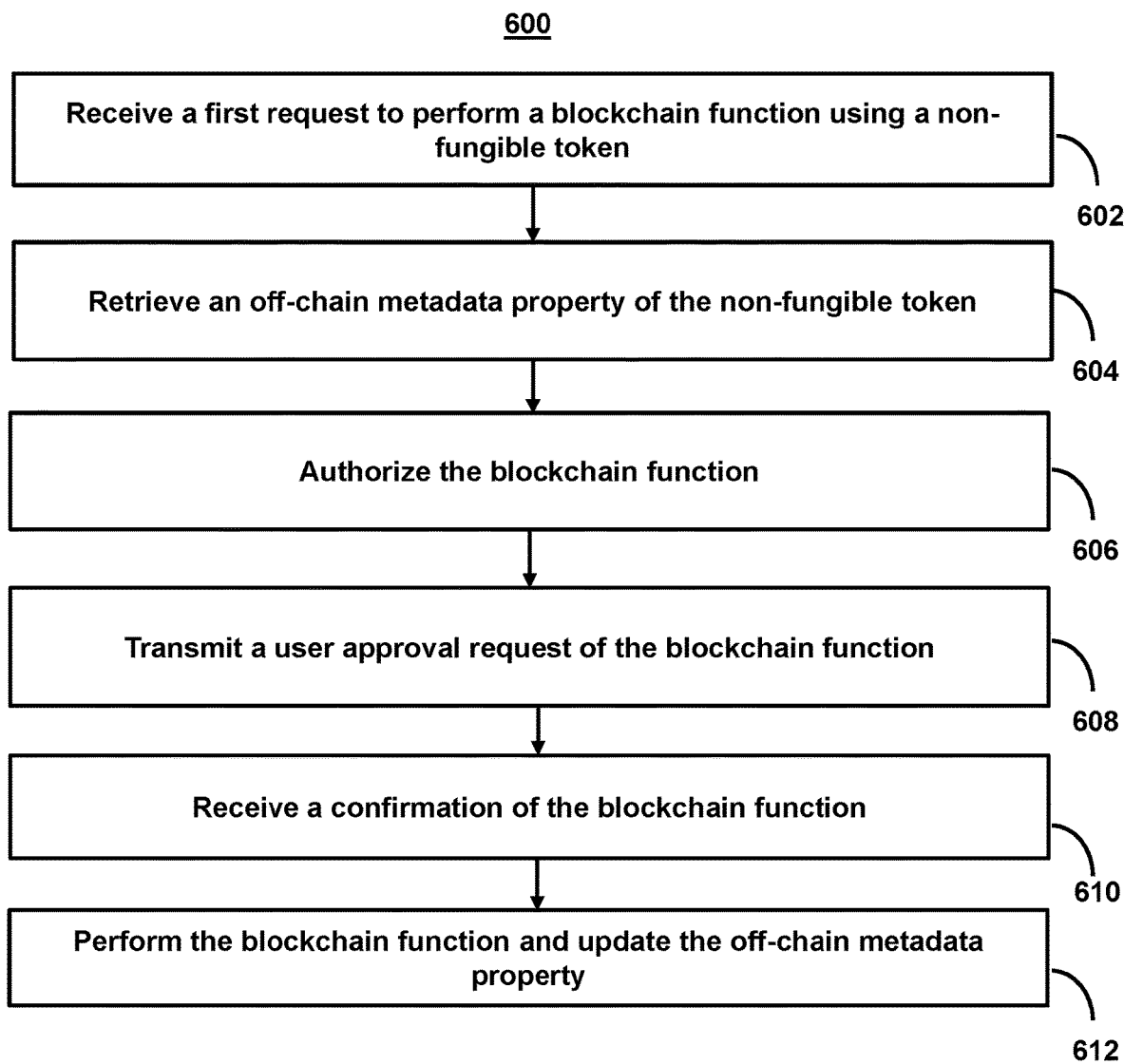
FIG. 6 shows a flowchart of the steps involved in dynamically updating metadata during blockchain functions, in accordance with one or more embodiments.

FIG. 6 shows a flowchart of the steps involved in dynamically updating metadata during blockchain functions, in accordance with one or more embodiments.

At step 602, process 600 (e.g., using one or more components described above) receives a first request to perform a blockchain function using a non-fungible token. For example, the system may receive a first request to perform a blockchain function using a non-fungible token, wherein the non-fungible token is identified by a public key for a user-specific digital storage resource application on a user device.

At step 604, process 600 (e.g., using one or more components described above) retrieves an off-chain metadata property of the non-fungible token. For example, the system may, in response to the first request, retrieve an off-chain metadata property of the non-fungible token, wherein the off-chain metadata property is available from an off-chain resource. For example, the off-chain metadata property may comprise a credit limit or balance corresponding to the non-fungible token and/or user.

At step 606, process 600 (e.g., using one or more components described above) authorizes the blockchain function. For example, the system may authorize the blockchain function using a smart contract that compares an on-chain characteristic of the blockchain function to the off-chain metadata property. For example, an on-chain characteristic may comprise a value (or amount of cryptocurrency) at issue in the blockchain function (e.g., a transaction).

At step 608, process 600 (e.g., using one or more components described above) transmits a user approval request of the blockchain function. For example, the system may, in response to authorizing the blockchain function, transmit a user approval request of the blockchain function to the user-specific digital storage resource application.

At step 610, process 600 (e.g., using one or more components described above) receives a confirmation of the blockchain function. For example, the system may receive, from the user-specific digital storage resource application on the user device, a confirmation of the blockchain function in response to the user approval request, wherein the confirmation is based on a private key for the user-specific digital storage resource application.

In some embodiments, authorizing the blockchain function using the smart contract that compares the on-chain characteristic of the blockchain function to the off-chain metadata property may comprise: determining a first type of off-chain characteristic; determining a second type of an on-chain characteristic that corresponds to the first type; and determining whether the off-chain metadata property corresponds to the on-chain characteristic. For example, when determining whether to authorize a blockchain function, the system may compare various criteria to threshold criteria of a similar type. The criteria may include an amount, an approved identity of a seller/receiver, a time period, etc. In some embodiments, the system may determine whether a given characteristic corresponds to an on/off chain counterpart.

In some embodiments, authorizing the blockchain function using the smart contract that compares the on-chain characteristic of the blockchain function to the off-chain metadata property may comprise: determining a first time period corresponding to the on-chain characteristic; determining a second first time period of the off-chain characteristic; and determining whether the first time period corresponds to the second time period. For example, when determining whether to authorize a blockchain function, the system may first determine a time period involved in a blockchain function (e.g., a transaction). The system may compare the time period to a time period during which the non-fungible token may be used. In response to determining that the time periods do not correspond, the system may not authorize the blockchain function.

At step 612, process 600 (e.g., using one or more components described above) performs the blockchain function and update the off-chain metadata property. For example, the system may, generate, from the user-specific digital storage resource application on the user device, a confirmation of the blockchain function in response to the user approval request, wherein the confirmation is based on a private key for the user-specific digital storage resource application, and wherein generating the confirmation causes performance of the blockchain function and a modification of the off-chain metadata property. In some embodiments, causing the performance of the modification of the off-chain metadata property may comprise: transmitting an instruction to an off-chain resource to update a current state of the off-chain metadata property; and receiving a confirmation from an oracle controlled by the off-chain resource. For example, as opposed to non-fungible tokens that rely on the Decentralized Oracle Network, the system may ensure security by using only selected oracles. The selected oracles may be controlled by a credit provider and may ensure that off-chain metadata properties are secured and correct. For example, as opposed to a conventional non-fungible token, the system may update a metadata property, which fundamentally differs from conventional non-fungible tokens.

In some embodiments, performance of the on-chain blockchain function may comprise a first performance portion between the first digital wallet application and to an on-chain receiver for the off-chain resource a second performance portion between the off-chain resource and the first content provider. For example, performance of the blockchain operation may comprise sending crypto assets (e.g., USDC, Bitcoin, private fungible tokens) to receivers. The receivers (e.g., a credit provider) may have an on-chain account as well as an off-chain account. The receiver may register the on-chain activity and in response trigger off-chain activity.

It is contemplated that the steps or descriptions of FIG. 6 may be used with any other embodiment of this disclosure. In addition, the steps and descriptions described in relation to FIG. 6 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 6.

Figure 7:
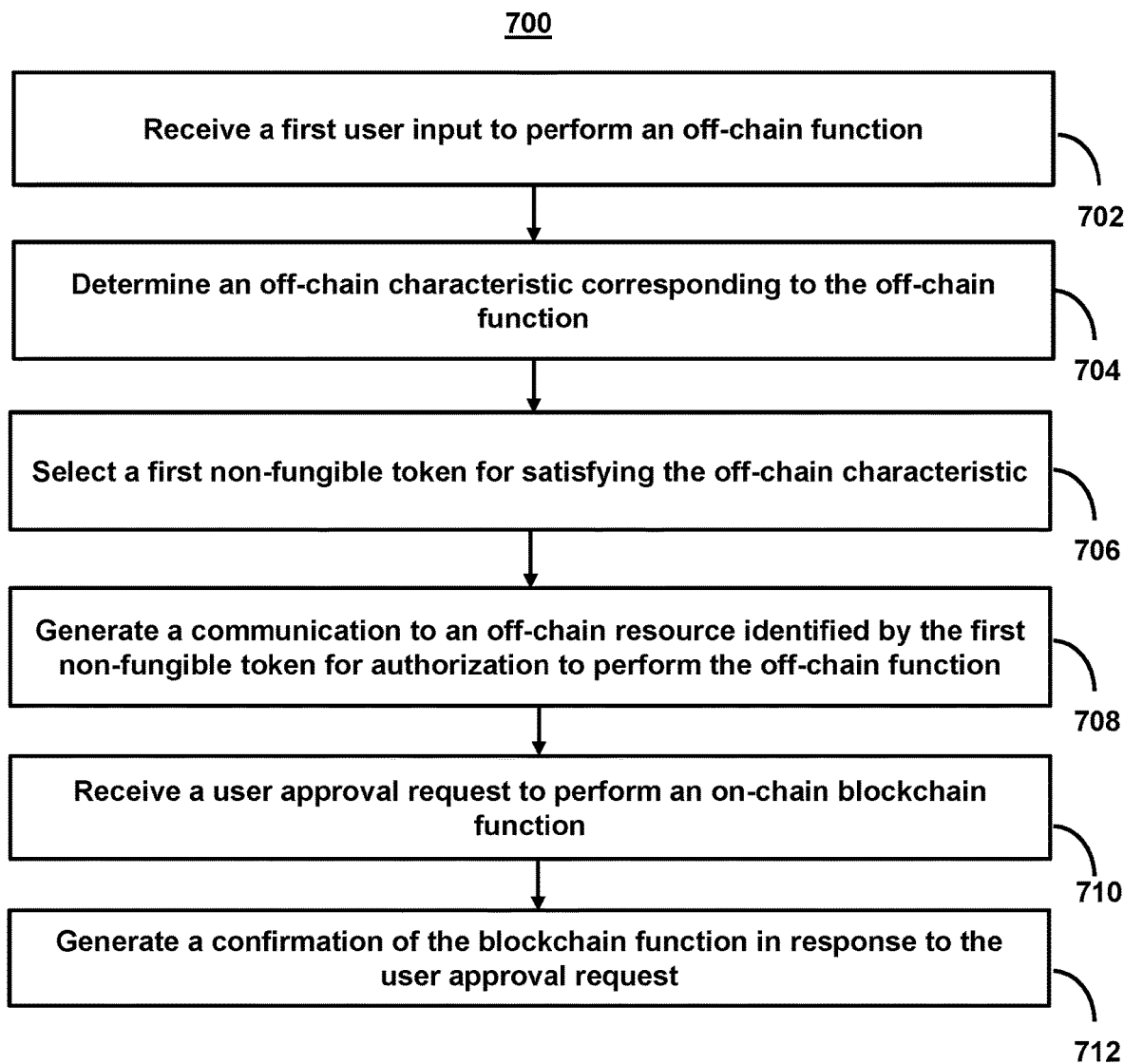
FIG. 7 shows a flowchart of the steps involved in integrating blockchain functions and external systems using wallet-specific digital assets, in accordance with one or more embodiments.

FIG. 7 shows a flowchart of the steps involved in integrating blockchain functions and external systems using wallet-specific digital assets, in accordance with one or more embodiments.

At step 702, process 700 (e.g., using one or more components described above) receives a first user input to perform an off-chain function. For example, the system may receive, from a user-specific digital storage resource application on a user device, a first user input to perform an off-chain function (e.g., make a payment using a line of credit) with a first content provider.

At step 704, process 700 (e.g., using one or more components described above) determines an off-chain characteristic corresponding to the off-chain function. For example, the system may, in response to the first user input, determine an off-chain characteristic (e.g., a price) corresponding to the off-chain function. The off-chain metadata property may be determined based on metadata updates performed by an off-chain resource, wherein the metadata updates are provided via an oracle controlled by the off-chain resource. For example, the variable non-fungible token may represent a balance of credit that is updated by a third party (e.g., a credit provider). The third party may both perform updates to the balance as well as control the data source of the updates (e.g., an oracle). In some embodiments, the off-chain metadata property is determined based on metadata updates performed by an off-chain resource, wherein the metadata updates are provided via an oracle controlled by the off-chain resource. For example, as opposed to non-fungible tokens that rely on the Decentralized Oracle Network, the system may ensure security by using only selected oracles. The selected oracles may be controlled by a credit provider and may ensure that off-chain metadata properties are secured and correct.

At step 706, process 700 (e.g., using one or more components described above) selects a first non-fungible token for satisfying the off-chain characteristic. For example, the system may receive a second user input selecting a non-fungible token for satisfying the off-chain characteristic. For example, the off-chain resource may comprise a credit issuer tied to the non-fungible token and satisfying the off-chain characteristic may comprise determining the off-chain metadata property for the first non-fungible token to be modified and determining a location of the off-chain metadata property. For example, in order to improve security, the system may store an off-chain metadata property (and a current value of the property) at a secure location. In order to satisfy the off-chain characteristic, the system may determine the address of the secure location. In some embodiments, satisfying the off-chain characteristic may comprise retrieving a user profile corresponding to the user-specific digital wallet application and determining, based on the user profile, a first metadata property threshold for a first metadata property of the non-fungible token.

In some embodiments, the system may allow a user (e.g., via user interface 400 (FIG. 4)) to select from a plurality of non-fungible tokens. For example, the system may, in response to determining the off-chain characteristic corresponding to the off-chain function, determine a plurality of non-fungible tokens for satisfying the off-chain characteristic. The system may generate for simultaneous display in a user interface, icons for the plurality of non-fungible tokens for satisfying the off-chain characteristic. For example, the system may allow a user to select from a plurality of available non-fungible tokens (e.g., each corresponding to a different account, credit line, asset type, etc.). The system may in response, determine which of the plurality of available non-fungible tokens have metadata properties that could satisfy the off-chain characteristic.

At step 708, process 700 (e.g., using one or more components described above) generates a communication to an off-chain resource identified by the first non-fungible token for authorization to perform the off-chain function. For example, the system may, in response to the second user input, generate a communication to an off-chain resource identified by the non-fungible token for authorization to perform the off-chain function using the non-fungible token, wherein performing the off-chain function causes an off-chain metadata property for the non-fungible token to be modified.

In some embodiments, authorizing the blockchain function using the smart contract that compares the on-chain characteristic of the blockchain function to the off-chain metadata property may comprise: determining a first type of off-chain characteristic; determining a second type of an on-chain characteristic that correspond to the first type; and determining whether the off-chain metadata property corresponds to the on-chain characteristic. For example, when determining whether to authorize a blockchain function, the system may compare various criteria to threshold criteria of a similar type. The criteria may include an amount, an approved identity of a seller/receiver, a time period, etc. In some embodiments, the system may determine whether a given characteristic corresponds to an on/off chain counterpart.

In some embodiments, authorizing the blockchain function using the smart contract that compares the on-chain characteristic of the blockchain function to the off-chain metadata property may comprise: determining a first time period corresponding to the on-chain characteristic; determining a second first time period of the off-chain characteristic; and determining whether the first time period corresponds to the second time period. For example, when determining whether to authorize a blockchain function, the system first determine a time period involved in a blockchain function (e.g., a transaction). The system may compare the time period to a time period during which the non-fungible token may be used. In response to determining that the time periods do not correspond, the system may not authorize the blockchain function.

At step 710, process 700 (e.g., using one or more components described above) receives a user approval request to perform an on-chain blockchain function. For example, the system may, in response receiving the authorization to perform the off-chain function, receive a user approval request to perform a blockchain function corresponding to the off-chain function. In some embodiments, the authorization to perform the off-chain function using the first non-fungible token may comprise the system determining a first value of the off-chain characteristic. The system may then determine a second value of an on-chain characteristic that correspond to the first value. The system may then determine whether the off-chain metadata property corresponds to the on-chain characteristic. For example, in some embodiments, the system may determine a conversion rate between an off-chain characteristic (e.g., a price of a good) and an on-chain characteristic (e.g., a price of a digital asset corresponding to the blockchain network).

At step 712, process 700 (e.g., using one or more components described above) generates a confirmation of the blockchain function in response to the user approval request. For example, the system may generate, from the user-specific digital storage resource application on the user device, a confirmation of the blockchain function in response to the user approval request, wherein the confirmation is based on a private key for the user-specific digital storage resource application, and wherein generating the confirmation causes performance of the blockchain function and a modification of the off-chain metadata property.

In some embodiments, the performance of the blockchain function comprises: a first performance portion between the user-specific digital storage resource application and to an on-chain receiver for the off-chain resource; and a second performance portion between the off-chain resource and the first content provider. For example, performance of the blockchain operation may comprise sending crypto assets (e.g., USDC, Bitcoin, private fungible tokens) to receivers. The receivers (e.g., a credit provider) may have an on-chain account as well as an off-chain account. The receiver may register the on-chain activity and in response trigger off-chain activity.

In some embodiments, causing the performance of the modification of the off-chain metadata property may comprise: transmitting an instruction to the off-chain resource to update a current state of the off-chain metadata property; and receiving an update confirmation from an oracle controlled by the off-chain resource. For example, as opposed to a conventional non-fungible token, the system may update a metadata property, which fundamentally differs from conventional non-fungible tokens.

It is contemplated that the steps or descriptions of FIG. 7 may be used with any other embodiment of this disclosure. In addition, the steps and descriptions described in relation to FIG. 7 may be done in alternative orders or in parallel to further the purposes of this disclosure. For example, each of these steps may be performed in any order, in parallel, or simultaneously to reduce lag or increase the speed of the system or method. Furthermore, it should be noted that any of the components, devices, or equipment discussed in relation to the figures above could be used to perform one or more of the steps in FIG. 7.

The above-described embodiments of the present disclosure are presented for purposes of illustration and not of limitation, and the present disclosure is limited only by the claims which follow. Furthermore, it should be noted that the features and limitations described in any one embodiment may be applied to any embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The present techniques will be better understood with reference to the following enumerated embodiments:

1. A method, the method comprising: receiving, from a user-specific digital storage resource application on a user device, a user request to generate a non-fungible token with variable metadata properties; in response to the user request, retrieving a user profile corresponding to the user-specific digital storage resource application; determining, based on the user profile, a first metadata property threshold for a first metadata property of the non-fungible token; determining a first encoded instruction for a first smart contract for the non-fungible token, wherein the first encoded instruction comprises a first automatic response to a first type of blockchain function of a plurality of types of blockchain functions interacting with the first smart contract, wherein the first automatic response comprises a comparison of a current state of the first metadata property against the first metadata property threshold, wherein the current state is stored off-chain; determining a second encoded instruction for the first smart contract, wherein the second encoded instruction comprises a second automatic response to the first type of blockchain function interacting with the first smart contract, wherein the second automatic response comprises querying a non-transferable smart contract address for the current state; and causing to be generated, at the user-specific digital storage resource application on the user device, a private key for the non-fungible token.
2. The method of the preceding embodiment, wherein the method is for minting non-fungible tokens with variable metadata properties.
3. The method of any one of the preceding embodiments, further comprising: determining a third encoded instruction for the first smart contract, wherein the third encoded instruction comprises a restriction on transferability of the non-fungible token; and determining a third automatic response to a second type of blockchain function of the plurality of types of blockchain functions interacting with the first smart contract, and wherein the third automatic response comprises a termination of any blockchain functions of the second type.
4. The method of any one of the preceding embodiments, further comprising: determining a fourth encoded instruction for the first smart contract, wherein the fourth encoded instruction comprises a list of smart contract addresses that may interact with the first smart contract; and determining a fourth automatic response, wherein the fourth automatic response comprises a termination of any blockchain functions involving a smart contract address not on the list of smart contract addresses.
5. The method of any one of the preceding embodiments, further comprising: generating the first smart contract comprising the first encoded instruction and the second encoded instruction; and determining a first smart contract address for the first smart contract.
6. The method of any one of the preceding embodiments, further comprising: in response to receiving the user request to generate the non-fungible token with variable metadata properties, determining an identity of a user corresponding to the user-specific digital storage resource application on a user device; and determining the first metadata property threshold based on the identity.
7. The method of any one of the preceding embodiments, wherein the variable metadata properties are determined based on metadata updates performed by an off-chain resource, wherein the metadata updates are provided via an oracle controlled by the off-chain resource.
8. The method of any one of the preceding embodiments, further comprising: receiving, from the user-specific digital storage resource application on the user device, a user input to use the non-fungible token to perform a blockchain function; and in response to performing the blockchain function, causing the current state of the first metadata property to be modified.
9. The method of any one of the preceding embodiments, further comprising: determining a fifth encoded instruction for the first smart contract, wherein the fifth encoded instruction comprises a criterion for modified the first metadata property threshold; and determining a fifth automatic response, wherein the fifth automatic response comprises monitoring for the criterion.
10. The method of any one of the preceding embodiments, further comprising: generating a public key for the non-fungible token, wherein the public key corresponds to the user-specific digital storage resource application on the user device; and transmitting a confirmation of a creation of the non-fungible token to an off-chain resource, wherein the off-chain resource controls an oracle for providing metadata updates to the non-fungible token.
11. The method of any one of the preceding embodiments, further comprising: determining a sixth encoded instruction for the first smart contract, wherein the sixth encoded instruction comprises a time period for use of the non-fungible token; and determining a sixth automatic response, wherein the sixth automatic response comprises a termination of any blockchain functions involving outside the time period.
12. A method, the method comprising: receiving a first request to perform a blockchain function using a non-fungible token, wherein the non-fungible token is identified by a public key for a user-specific digital storage resource application on a user device; in response to the first request, retrieving an off-chain metadata property of the non-fungible token, wherein the off-chain metadata property is available from an off-chain resource; authorizing the blockchain function using a smart contract that compares an on-chain characteristic of the blockchain function to the off-chain metadata property; in response to authorizing the blockchain function, transmitting a user approval request of the blockchain function to the user-specific digital storage resource application; receiving, from the user-specific digital storage resource application on the user device, a confirmation of the blockchain function in response to the user approval request, wherein the confirmation is based on a private key for the user-specific digital storage resource application; and in response to receiving the confirmation, causing performance of the blockchain function and updating the off-chain metadata property.

13. The method of any one of the preceding embodiments, wherein retrieving the off-chain metadata property of the non-fungible token further comprises: executing a first encoded instruction for a first smart contract for the non-fungible token, wherein the first encoded instruction comprises a first automatic response, wherein the first automatic response comprises: determining a current state of the off-chain metadata property; determining an off-chain metadata property threshold; and comparing the current state to the off-chain metadata property threshold.

14. The method of any one of the preceding embodiments, wherein retrieving the off-chain metadata property of the non-fungible token further comprises: executing a second encoded instruction for a first smart contract for the non-fungible token, wherein the second encoded instruction comprises a second automatic response, wherein the second automatic response comprises: determining a smart contract address for retrieving a current state of the off-chain metadata property; and querying the smart contract address for the current state.

15. The method of any one of the preceding embodiments, wherein authorizing the blockchain function using the smart contract that compares the on-chain characteristic of the blockchain function to the off-chain metadata property further comprises: determining a first value of the on-chain characteristic; determining a second value of an off-chain characteristic; and determining whether the first value corresponds to the second value.

16. The method of any one of the preceding embodiments, wherein authorizing the blockchain function using the smart contract that compares the on-chain characteristic of the blockchain function to the off-chain metadata property further comprises: determining a first type of the on-chain characteristic; determining a second type of an off-chain characteristic; and determining whether the first type corresponds to the second type.

17. The method of any one of the preceding embodiments, wherein authorizing the blockchain function using the smart contract that compares the on-chain characteristic of the blockchain function to the off-chain metadata property further comprises: determining a first user identity corresponding to the on-chain characteristic; determining a second user identity of an off-chain characteristic; and determining whether the first user identity corresponds to the second user identity.

18. The method of any one of the preceding embodiments, wherein authorizing the blockchain function using the smart contract that compares the on-chain characteristic of the blockchain function to the off-chain metadata property further comprises: determining a first blockchain protocol corresponding to the on-chain characteristic; determining a second blockchain protocol of an off-chain characteristic; and determining whether the first blockchain protocol corresponds to the second blockchain protocol.

19. The method of any one of the preceding embodiments, wherein authorizing the blockchain function using the smart contract that compares the on-chain characteristic of the blockchain function to the off-chain metadata property further comprises: determining a first time period corresponding to the on-chain characteristic; determining a second time period of an off-chain characteristic; and determining whether the first time period corresponds to the second time period.

20. The method of any one of the preceding embodiments, wherein the off-chain metadata property is determined based on metadata updates performed by the off-chain resource, wherein the metadata updates are provided via an oracle controlled by the off-chain resource.

21. The method of any one of the preceding embodiments, wherein updating the off-chain metadata property comprises: transmitting an instruction to the off-chain resource to update a current state of the off-chain metadata property; and receiving an update confirmation from an oracle controlled by the off-chain resource.

22 A method, the method comprising: receiving, from a user-specific digital storage resource application on a user device, a first user input to perform an off-chain function with a first content provider; in response to the first user input, determining an off-chain characteristic corresponding to the off-chain function; receiving a second user input selecting a non-fungible token for satisfying the off-chain characteristic; in response to the second user input, generating a communication to an off-chain resource identified by the non-fungible token for authorization to perform the off-chain function using the non-fungible token, wherein performing the off-chain function causes an off-chain metadata property for the non-fungible token to be modified; in response receiving the authorization to perform the off-chain function, receiving a user approval request to perform a blockchain function corresponding to the off-chain function; and generating, from the user-specific digital storage resource application on the user device, a confirmation of the blockchain function in response to the user approval request, wherein the confirmation is based on a private key for the user-specific digital storage resource application, and wherein generating the confirmation causes performance of the blockchain function and a modification of the off-chain metadata property.

23. The method of any one of the preceding embodiments, wherein the performance of the blockchain function comprises: a first performance portion between the user-specific digital storage resource application and to an on-chain receiver for the off-chain resource; and a second performance portion between the off-chain resource and the first content provider.

24. The method of any one of the preceding embodiments, wherein satisfying the off-chain characteristic further comprises: determining the off-chain metadata property for the non-fungible token to be modified; and determining a location of the off-chain metadata property.
25. The method of any one of the preceding embodiments, wherein satisfying the off-chain characteristic further comprises: retrieving a user profile corresponding to the user-specific digital storage resource application; and determining, based on the user profile, a first metadata property threshold for a first metadata property of the non-fungible token.
26. The method of any one of the preceding embodiments, further comprising: in response to determining the off-chain characteristic corresponding to the off-chain function, determining a plurality of non-fungible tokens for satisfying the off-chain characteristic; and generating for simultaneous display in a user interface, icons for the plurality of non-fungible tokens for satisfying the off-chain characteristic.
27. The method of any one of the preceding embodiments, wherein the authorization to perform the off-chain function using the non-fungible token comprises: determining a first value of the off-chain characteristic; determining a second value of an on-chain characteristic that corresponds to the first value; and determining whether the off-chain metadata property corresponds to the on-chain characteristic.
28. The method of any one of the preceding embodiments, wherein authorizing the blockchain function comprises using a smart contract that compares an on-chain characteristic of the blockchain function to the off-chain metadata property by: determining a first type of off-chain characteristic; determining a second type of the on-chain characteristic that correspond to the first type of off-chain characteristic; and determining whether the off-chain metadata property corresponds to the on-chain characteristic.
29. The method of any one of the preceding embodiments, wherein authorizing the blockchain function comprises using a smart contract that compares an on-chain characteristic of the blockchain function to the off-chain metadata property by: determining a first time period corresponding to the on-chain characteristic; determining a second time period of the off-chain characteristic; and determining whether the first time period corresponds to the second time period.
30. The method of any one of the preceding embodiments, wherein the off-chain metadata property is determined based on metadata updates performed by the off-chain resource, wherein the metadata updates are provided via an oracle controlled by the off-chain resource.
31. The method of any one of the preceding embodiments, wherein causing the performance of the modification of the off-chain metadata property further comprises: transmitting an instruction to the off-chain resource to update a current state of the off-chain metadata property; and receiving an update confirmation from an oracle controlled by the off-chain resource.
32. A tangible, non-transitory, machine-readable medium storing instructions that, when executed by a data processing apparatus, cause the data processing apparatus to perform operations comprising those of any of embodiments 1-31.
33. A system comprising one or more processors; and memory storing instructions that, when executed by the processors, cause the processors to effectuate operations comprising those of any of embodiments 1-32.
34. A system comprising means for performing any of embodiments 1-33.

What is claimed is:
1. A method for generating non-fungible tokens for a network of blocks containing cryptographic hashes of previous blocks, wherein the non-fungible tokens comprise variable metadata properties linked to designated off-chain resources for use in secure encrypted, communications across disparate computer networks, the method comprising:
receiving, from a user-specific digital storage resource application on a user device, a user request to generate a non-fungible token with variable metadata properties;
retrieving, in response to the user request, a user profile corresponding to the user-specific digital storage resource application;
determining, based on the user profile, a first metadata property threshold for a first metadata property of the non-fungible token;
determining a first encoded instruction for a first smart contract for the non-fungible token, wherein the first encoded instruction comprises a first automatic response to a first type of blockchain function of a plurality of types of blockchain functions interacting with the first smart contract, wherein the first automatic response comprises a comparison of a current state of the first metadata property against the first metadata property threshold, wherein the current state is stored off-chain;
determining a second encoded instruction for the first smart contract, wherein the second encoded instruction comprises a second automatic response to the first type of blockchain function interacting with the first smart contract, wherein the second automatic response comprises querying a non-transferable smart contract address for the current state; and
causing to be generated, at the user-specific digital storage resource application on the user device, a private key for the non-fungible token.
2. The method of claim 1, further comprising:
determining a third encoded instruction for the first smart contract, wherein the third encoded instruction comprises a restriction on transferability of the non-fungible token; and
determining a third automatic response to a second type of blockchain function of the plurality of types of blockchain functions interacting with the first smart contract, and wherein the third automatic response comprises a termination of any blockchain functions of the second type.
3. The method of claim 1, further comprising:
determining a fourth encoded instruction for the first smart contract, wherein the fourth encoded instruction comprises a list of smart contract addresses that may interact with the first smart contract; and
determining a fourth automatic response, wherein the fourth automatic response comprises a termination of any blockchain functions involving a smart contract address not on the list of smart contract addresses.
4. The method of claim 1, further comprising:
generating the first smart contract comprising the first encoded instruction and the second encoded instruction; and
determining a first smart contract address for the first smart contract.
5. The method of claim 1, further comprising:
determining, in response to receiving the user request to generate the non-fungible token with variable metadata properties, an identity of a user corresponding to the user-specific digital storage resource application on a user device; and determining the first metadata property threshold based on the identity.

6. The method of claim 1, wherein the variable metadata properties are determined based on metadata updates performed by an off-chain resource, wherein the metadata updates are provided via an oracle controlled by the off-chain resource.

7. The method of claim 1, further comprising:

receiving, from the user-specific digital storage resource application on the user device, a user input to use the non-fungible token to perform a blockchain function; and causing, in response to performing the blockchain function, the current state of the first metadata property to be modified.

8. The method of claim 1, further comprising:

determining a fifth encoded instruction for the first smart contract, wherein the fifth encoded instruction comprises a criterion for modified the first metadata property threshold; and determining a fifth automatic response, wherein the fifth automatic response comprises monitoring for the criterion.

9. The method of claim 1, further comprising:

generating a public key for the non-fungible token, wherein the public key corresponds to the user-specific digital storage resource application on the user device; and transmitting a confirmation of a creation of the non-fungible token to an off-chain resource, wherein the off-chain resource controls an oracle for providing metadata updates to the non-fungible token.

10. The method of claim 1, further comprising:

determining a sixth encoded instruction for the first smart contract, wherein the sixth encoded instruction comprises a time period for use of the non-fungible token; and determining a sixth automatic response, wherein the sixth automatic response comprises a termination of any blockchain functions involving outside the time period.

11. A non-transitory, computer-readable medium comprising instructions that when executed by one or more processors cause operations comprising:

receiving, from a user-specific digital storage resource application on a user device, a user request to generate a non-fungible token with variable metadata properties, wherein the variable metadata properties are determined based on metadata updates performed by an off-chain resource, and wherein the metadata updates are provided via an oracle controlled by the off-chain resource;

retrieving, in response to the user request, a user profile corresponding to the user-specific digital storage resource application;

determining, based on the user profile, a first metadata property threshold for a first metadata property of the non-fungible token;

determining a first encoded instruction for a first smart contract for the non-fungible token, wherein the first encoded instruction comprises a first automatic response to a first type of blockchain function of a plurality of types of blockchain functions interacting with the first smart contract, wherein the first automatic response comprises a comparison of a current state of the first metadata property against the first metadata property threshold, wherein the current state is stored off-chain;

determining a second encoded instruction for the first smart contract, wherein the second encoded instruction comprises a second automatic response to the first type of blockchain function interacting with the first smart contract, wherein the second automatic response comprises querying a non-transferable smart contract address for the current state; and causing to be generated, at the user-specific digital storage resource application on the user device, a private key for the non-fungible token.

12. The non-transitory, computer-readable medium of claim 11, further comprising:

determining a third encoded instruction for the first smart contract, wherein the third encoded instruction comprises a restriction on transferability of the non-fungible token; and determining a third automatic response to a second type of blockchain function of the plurality of types of blockchain functions interacting with the first smart contract, and wherein the third automatic response comprises a termination of any blockchain functions of the second type.

13. The non-transitory, computer-readable medium of claim 11, further comprising:

determining a fourth encoded instruction for the first smart contract, wherein the fourth encoded instruction comprises a list of smart contract addresses that may interact with the first smart contract; and determining a fourth automatic response, wherein the fourth automatic response comprises a termination of any blockchain functions involving a smart contract address not on the list of smart contract addresses.

14. The non-transitory, computer-readable medium of claim 11, further comprising:

generating the first smart contract comprising the first encoded instruction and the second encoded instruction; and determining a first smart contract address for the first smart contract.

15. The non-transitory, computer-readable medium of claim 11, further comprising:

determining, in response to receiving the user request to generate the non-fungible token with variable metadata properties, an identity of a user corresponding to the user-specific digital storage resource application on a user device; and determining the first metadata property threshold based on the identity.

16. The non-transitory, computer-readable medium of claim 11, further comprising:

receiving, from the user-specific digital storage resource application on the user device, a user input to use the non-fungible token to perform a blockchain function; and causing, in response to performing the blockchain function, the current state of the first metadata property to be modified.

17. The non-transitory, computer-readable medium of claim 11, further comprising:

determining a fifth encoded instruction for the first smart contract, wherein the fifth encoded instruction comprises a criterion for modified the first metadata property threshold; and determining a fifth automatic response, wherein the fifth automatic response comprises monitoring for the criterion.

18. The non-transitory, computer-readable medium of claim 11, further comprising:
generating a public key for the non-fungible token, wherein the public key corresponds to the user-specific digital storage resource application on the user device; and
transmitting a confirmation of a creation of the non-fungible token to an off-chain resource, wherein the off-chain resource controls an oracle for providing metadata updates to the non-fungible token.

19. The non-transitory, computer-readable medium of claim 11, further comprising:
determining a sixth encoded instruction for the first smart contract, wherein the sixth encoded instruction comprises a time period for use of the non-fungible token; and
determining a sixth automatic response, wherein the sixth automatic response comprises a termination of any blockchain functions involving outside the time period.

* * * * *